(12) United States Patent
Treadaway et al.

(10) Patent No.: US 6,907,048 B1
(45) Date of Patent: Jun. 14, 2005

(54) METHOD AND APPARATUS FOR TRANSPORTING ETHERNET DATA PACKETS VIA RADIO FRAMES IN A WIRELESS METROPOLITAN AREA NETWORK

(75) Inventors: Kirk Treadaway, Aptos, CA (US); Tho Le Ngoc, Anjou (CA); Darryl Denton, Sunnyvale, CA (US)

(73) Assignee: Alvarion Israel (2003) Ltd., Tel Aviv (IL)

( * ) Notice: Subject to any disclaimer, the term of this patent is extended or adjusted under 35 U.S.C. 154(b) by 0 days.

(21) Appl. No.: 09/158,778

(22) Filed: Sep. 23, 1998

Related U.S. Application Data

(63) Continuation-in-part of application No. 08/950,028, filed on Oct. 14, 1997, now abandoned.
(60) Provisional application No. 60/086,459, filed on May 22, 1998.

(51) Int. Cl.$^7$ .............................. H04Q 7/24; H04J 3/24
(52) U.S. Cl. ....................... 370/474; 370/328; 370/338; 370/349
(58) Field of Search ................................. 370/335, 337, 370/474, 395.52, 470, 328–333, 338–347, 349–350, 352, 355, 360, 389, 401, 442, 479

(56) References Cited

U.S. PATENT DOCUMENTS

| | | |
|---|---|---|
| 3,564,144 A | 2/1971 | Diggelmann |
| 3,988,545 A | 10/1976 | Kuemmerle et al. |

(Continued)

FOREIGN PATENT DOCUMENTS

| | | | |
|---|---|---|---|
| GB | 2 306 278 A | 4/1997 | ............. H04L/1/00 |
| GB | 2316583 A | 2/1998 | ........... H04L/29/06 |
| WO | WO 94/27382 | 11/1994 | ........... H04B/7/216 |
| WO | WO 98/10541 A1 | 3/1998 | ............. H04J/3/16 |

OTHER PUBLICATIONS

"Design of A Selective FEC Subsystem to Counteract Rain Fading in Ku–Band TDMA Systems," G. McMillen, B. Mazur and T. Abdel–Nabi, International Journal of Satellite Communications, vol. 4, pp. 75–82, 1986.

"Frequency Diversity and Its Applications," F. Carassa, G. Tartara and E. Matricciani, International Journal of Satellite Communications, vol. 6, pp. 313–322, 1988.

(Continued)

*Primary Examiner*—Afsar Qureshi
(74) *Attorney, Agent, or Firm*—Browdy and Neimark, P.L.L.C.

(57) ABSTRACT

Method and apparatus for transporting Ethernet data packets via radio frames in a wireless metropolitan area network. A terminal includes a data packet receiver for receiving data packets for communication over a wireless link wherein not every data packet has a same length; a data packet formatting apparatus for formatting the data packets according to radio frames wherein the radio frames each have a same length and wherein the data packets are formatted into the radio frames such that boundaries for the data packets are not necessarily aligned with boundaries for the radio frames; and a wireless transceiver for communicating the radio frames over the wireless link. The packets can be Fast Ethernet packets. The terminal does not convert the Ethernet data packets into a telephony communication protocol or into an asynchronous transfer mode (ATM) protocol prior to communication of the radio frames over the wireless link. The terminal can include a data packet synchronizer for synchronizing the data packets to a clock signal associated with the radio frames. The data packets can be time-division multiplexed into the radio frames. According to another aspect, a method of transporting Ethernet data packets via radio frames includes steps of receiving Ethernet data packets wherein each data packet includes a preamble and a start-of-frame delimiter, stripping off the preamble and start-of-frame delimiter, formatting the packet data according to radio frames, including appending a synch field to the packet data, and appending a length field to the packet data.

59 Claims, 18 Drawing Sheets

U.S. PATENT DOCUMENTS

| | | | |
|---|---|---|---|
| 4,731,785 A | | 3/1988 | Ferenc et al. |
| 4,876,742 A | | 10/1989 | Vacon et al. |
| 4,893,340 A | | 1/1990 | Lubarsky et al. |
| 4,975,906 A | | 12/1990 | Takiyasu et al. |
| 5,050,166 A | * | 9/1991 | Cantoni et al. ............. 370/473 |
| 5,119,226 A | | 6/1992 | Allen et al. |
| 5,159,592 A | | 10/1992 | Perkins |
| 5,220,678 A | | 6/1993 | Feei |
| 5,276,703 A | | 1/1994 | Budin et al. |
| 5,303,303 A | | 4/1994 | White |
| 5,307,348 A | | 4/1994 | Buchholz et al. |
| 5,313,461 A | | 5/1994 | Ahl et al. |
| 5,436,902 A | | 7/1995 | McNamara et al. |
| 5,442,633 A | | 8/1995 | Perkins et al. |
| 5,475,681 A | | 12/1995 | White et al. |
| 5,519,691 A | | 5/1996 | Darcie et al. |
| 5,563,728 A | | 10/1996 | Allen et al. |
| 5,563,889 A | | 10/1996 | Gard et al. |
| 5,636,213 A | * | 6/1997 | Eastmond et al. .......... 370/278 |
| 5,648,969 A | | 7/1997 | Pasternak et al. |
| 5,657,371 A | | 8/1997 | Mahany et al. |
| 5,754,945 A | | 5/1998 | Lin et al. |
| 5,953,319 A | | 9/1999 | Dutta et al. |
| 5,978,384 A | * | 11/1999 | Kotchey ..................... 370/445 |
| 6,169,729 B1 | * | 1/2001 | Feuerstraeter ............... 370/296 |
| 6,172,972 B1 | * | 1/2001 | Birdwell et al. ............ 370/349 |

OTHER PUBLICATIONS

"Up–Link Power Control of Satellite Earth–Stations As A Fade Countermeasure of 20/30 GHz Communications System," J. Hörle, International Journal of Satellite Communications, vol. 6, pp. 323–330, 1988.

"A Technique for Estimating the Throughput of Adaptive TDMA Fade Countermeasure Systems," S. Barton and S. Dinwiddy, International Journal of Satellite Communications, vol. 6, pp. 331–341, 1988.

"Fade Countermeasures at $K_\alpha$ Band for Olympus," M. Willis and B. Evans, International Journal of Satellite Communications, vol. 6, pp. 301–311, 1988.

"A Unified Statistical Rain–Attenuation Model for Communication Link Fade Predictions and Optimal Stochastic Fade Control Design Using A Location–Dependent Rain–Statistics Database," Robert Manning, International Journal of Satellite Communications, vol. 8, pp. 11–30, 1990.

"Adaptive Modulation As A Fade Countermeasure. An Olympus Experiment," M. Filip and E. Vilar, International Journal of Satellite Communications, vol. 8, pp. 31–41, 1990.

*Radiowave Propagation in Satellite Communications*, Louis J. Ippolito, Jr., Van Nostrand Reinhold Company 1986, pp. 42–57 and 64–92.

*Digital Communications*, John G. Proakis, Mc Graw–Hill, Third Edition, 1990, pp. 278–285.

*CDMA Principles of Spread Spectrum Communication*, Andrew J. Viterbi, Addison–Wesley Wireless Communications Series, 1995, pp. 155–168.

Information on Giganet Ltd., the Microwave Fiber™ company, displayed at www.giganet–corp.com, Apr. 21, 1998.

European Patent Office: *Patent Abstracts of Japan*, Abstract for JP 07336367, published Dec. 22, 1995, applicant; Canon Inc., title: "Radio Communication Equipment".

Goldberg, Lee, "100Base–T4 Transceiver Simplifies Adapter Repeater and Switch Designs," Electronic Design, vol. 43, No. 6, Mar. 1995, USA.

* cited by examiner

| synch | aux | data | R-S parity |
|---|---|---|---|
| 352 | 354 | 356 | 358 |

Quad  = 2∗I1'+Q1';          — Map Quadrant Tag [0 1 2 3]
Phi   = [0 1 3 2] ;          — to Angle = [0 1 2 3]
Angle = Phi(Quad)
Sum   = (Sum+Angle)modulo 4 ;
I1"   = bit 1 of Sum ;    I0"  = I0';
Q1"   = bit 0 of Sum ;    Q0"  = Q0';

Angle = 2∗RxIs'+ RxQs' ;
Phi'  = [0 1 3 2] ;
Diff  = (Phi'(Angle)−Phi$_0$) modulo 4 ;
Phi$_0$ = Phi'(Angle) ;
RxIs  = bit 1 of Phi'(Diff) ;   RxIm = RxIm' ;
TxIs  = bit 0 of Phi'(Diff) ;   RxQm = RxQm' ;

A: data rate = 4 bits/symbol, symbol rate = 27.5 Msymbols (mega-symbols)/second

A': data rate = 4 bits/symbol, symbol rate = 27.5 Msymbols/second

B: data rate = 2 bits/symbol, symbol rate = 27.5 Msymbols/second

B': data rate = 2 bits/symbol, symbol rate = 27.5 Msymbols/second

C: data rate = 2 bits/symbol, symbol rate = 3.4375 Msymbols/second

C': data rate = 2 bits/symbol, symbol rate = 27.5 Msymbols/second

METHOD AND APPARATUS FOR TRANSPORTING ETHERNET DATA PACKETS VIA RADIO FRAMES IN A WIRELESS METROPOLITAN AREA NETWORK

This is a Continuation-in-Part of application Ser. No. 08/950,028, filed Oct. 14, 1997 now abandoned, the contents of which are hereby incorporated by reference. This application claims the benefit of U.S. Provisional Application Ser. No. 60/086,459, entitled, "Method and Apparatus for Wireless Communication of Fast Ethernet Data Packets," filed May 22, 1998.

FIELD OF THE INVENTION

The invention relates to a terminal for a wireless network for a metropolitan area. More particularly, the invention relates to a terminal for transporting Ethernet data packets via radio frames in a wireless metropolitan area network.

BACKGROUND OF THE INVENTION

Computers utilized in modern office environments are typically coupled to a local area network (LAN). The LAN allow users of the computers to share common resources, such as a common printer included in the network, and allows the users to share information files, such as by including one or more file servers in the network. In addition, the users are typically able to communicate information with each other through electronic messaging. A commonly utilized type of LAN is Ethernet. Currently, a variety of products which support Ethernet are commercially available from a variety of sources. Other types of LANs are also utilized, such as token ring, fiber distributed data interface (FDDI) or asynchronous transfer mode (ATM).

LANs are often connected to a wide area network (WAN) via a telephone modem. Thus, information is communicated over the WAN via a communication link provided by a telephone service provider. These telephone links, however, are generally designed to have a bandwidth that is sufficient for voice communication. As such, the rate at which information can be communicated over these telephone links is limited. As computers and computer applications become more sophisticated, however, they tend to generate and process increasingly large amounts of data to be communicated. For example, the communication of computer graphics generally requires a large amount of bandwidth relative to voice communication. Thus, the telephone link can become a data communication bottleneck.

Business organizations and their affiliates are often spread over several sites in a metropolitan or geographical area. For example, a business organization can have a headquarters, one or more branch offices, and various other facilities. For such business organizations, LANs located at the various sites will generally need to communicate information with each other. Wireless communication links for connecting local area networks are known. For example, U.S. Pat. No. 4,876,742, entitled "Apparatus and Method for Providing a Wireless Link Between Two Area Network Systems," and U.S. Pat. No. 5,436,902, entitled "Ethernet Extender," each disclose a wireless communication link for connecting LANs.

Availability is a measure of the average number of errors which occur in digitally transmitted data. An availability of 99.99 percent is commonly required for radio communications. For an availability of 99.99 percent, the average error rate for digitally communicated data must be maintained below $1\times10^{-6}$ errors per bit, 99.99 percent of the time. The integrity of a wireless communication link, however, is largely dependent upon transient environmental conditions, such as precipitation. Environmental precipitation causes a severe attenuation of the transmitted signal. For example, to maintain an availability of 99.99 in the presence of environmental precipitation, the signal must be transmitted at a level that is 24 dB/km higher than otherwise. Therefore, to ensure an acceptable data error rate under all expected conditions, data is typically communicated over a wireless communication link at a relatively high power and at a relatively low rate. The amount of data required to be communicated over the wireless link, however, can vary widely over time and can vary independently of environmental conditions. In addition, wireless links, especially those operated at high power levels, can cause interference with other wireless links operating in the same geographical area. Thus, the wireless link can become a data communication bottleneck.

Therefore, a technique is needed for efficiently and cost effectively communicating data over a wireless link between Ethernet local area networks.

Known wireless transmission systems for LAN have a disadvantage in that they require conversion from the LAN protocol to an intermediate protocol prior to wireless transmission. Such known systems perform conversion to a telephony protocol or to an asynchronous transfer mode (ATM) protocol.

Therefore, what is needed is a technique for communicating data over a wireless link between local area networks which does not suffer from these drawbacks.

SUMMARY OF THE INVENTION

The invention is a method and apparatus for transporting Ethernet data packets via radio frames in a wireless metropolitan area network. A terminal for transporting data packets via radio frames includes a data packet receiver for receiving data packets for communication over a wireless link wherein not every data packet has a same length, a data packet formatting apparatus coupled to the data packet receiver, the data packet formatting apparatus for formatting the data packets according to radio frames wherein the radio frames each have a same length and wherein the data packets are formatted into the radio frames such that boundaries for the data packets are not necessarily aligned with boundaries for the radio frames, and a wireless transceiver coupled to the packet formatting apparatus, the wireless transceiver for communicating the radio frames over the wireless link. The terminal need not convert the Ethernet data packets into a telephony communication protocol or into an asynchronous transfer mode (ATM) protocol prior to communication of the radio frames over the wireless link. The terminal can include a data packet synchronizer coupled to the data packet receiver and to the data packet formatting apparatus for synchronizing the data packets to a clock signal associated with the radio frames. The data packets can be Fast Ethernet data packets. The data packets can be time-division multiplexed into the radio frames. Each radio frame can include a data field having a predetermined length for receiving the data packets. The data packets can be received by the data packet receiver separated by an inter-packet gap and wherein a code representative of the inter-packet gap is stored in the data field between the data packets. The data packet receiver can receive the data packets from a local area network coupled to the data packet receiver via a twisted pair of wires. The data packet receiver can be an Ethernet switch. The Ethernet switch can include a 100BASE-T port for receiving the data packets from the local area network. The Ethernet switch can include an MII (media independent interface) for providing the data packets to the packet formatting apparatus. The data packet receiver can receive the data packets from a local area network coupled to the data packet receiver via a fiber optic cable. The radio frames can be communicated over the wireless link according to full-duplex communication.

According to another aspect of the present invention, a method of transporting data packets via radio frames includes steps of receiving data packets wherein not every data packet has a same length, formatting the data packets according to radio frames wherein the radio frames each have a same length and wherein the data packets are formatted into the radio frames such that boundaries for the data packets are not necessarily aligned with boundaries for the radio frames, and communicating the radio frames over the wireless link. Each radio frame can include a data field having a predetermined length and wherein the step of formatting can include a step of placing the data packets into the data field. The step of receiving data packets can include a step of receiving an inter-packet gap between each packet. The method can include a step of synchronizing the data packets to a clock signal associated with the radio frames. The step of formatting the data packets can include a step of inserting a code representative of an inter-packet gap into radio frames between each data packet. The step of receiving the data packets can include a step of receiving the data packets from a local area network via a twisted pair of wires. The method can comprise a step of mapping portions of the radio frame to quadrature amplitude modulation symbols. The step of formatting the data packets according to radio frames can include a step of time-division multiplexing the data packets into the radio frames. The data packets can be Fast Ethernet data packets. The method does not require a step of converting the data packets into a telephony communication protocol or into an asynchronous transfer mode (ATM) protocol prior to communication of the radio frame over the wireless link. The method can include steps of receiving the radio frames from the wireless link, and reconstructing the data packets from received radio frames.

According to a further aspect of the present invention, a method of transporting data packets via radio frames includes steps of receiving data packets wherein not every data packet has a same length and wherein each data packet is separated by an inter-packet gap, formatting the data packets according to radio frames wherein each radio frame includes a data field having a predetermined length and wherein the data packets are formatted into each data field one after the other wherein each data packet is separated from its neighbors by a code representative of an inter-packet and wherein boundaries for the data packets are not necessarily aligned with boundaries for the radio frames such that the data packets are time-division multiplexed into the radio frames, and communicating the radio frames over the wireless link. The data packets can be Fast Ethernet packets. The method can include a step of synchronizing the data packets to a clock signal associated with the radio frames. The method need not include a step of converting the data packets into a telephony communication protocol or into an asynchronous transfer mode (ATM) protocol prior to communication of the radio frames over the wireless link. The code representative of an inter-packet gap can be representative of an inter-packet gap of approximately of 0.96 $\mu$s.

According to yet another aspect of the invention, a method of transporting Fast Ethernet data packets via radio frames over a wireless link includes steps of receiving Fast Ethernet data packets into a receiver from a first local area network via a twisted pair of wires, formatting the data packets according to radio frames wherein the radio frames each have a same length and wherein the Fast Ethernet data packets are formatted into radio frames such that boundaries for the Fast Ethernet packets are not necessarily aligned with boundaries for the radio frames, communicating the radio frames over the wireless link, receiving the radio frames from the wireless link, reconstructing the Fast Ethernet data packets from received radio frames, and communicating reconstructed Fast Ethernet data packets to a second local area network. Each radio frame can include a data field having a predetermined length and wherein the step of formatting can include a step of placing the data packets into the data field. The step of formatting the data packets according to radio frames can include a step of time-division multiplexing the data packets into the radio frames. The method can include a step of synchronizing the data packets to a clock signal associated with the radio frames. The method need not include a step of converting the data packets into a telephony communication protocol or into an asynchronous transfer mode (ATM) protocol prior to communication of the radio frames over the wireless link.

According to a still further aspect of the present invention, a terminal for transporting data packets via radio frames includes a data packet receiver for receiving data packets for communication over a wireless link wherein not every data packet has a same length, a packet formatting apparatus coupled to the data packet receiver, the packet formatting apparatus for formatting the data packets according to radio frames. The packet formatting apparatus includes means for performing forward error correction on data from the data packets thereby forming error corrected data, means for inserting the error corrected data into radio frames, and means for randomizing data within the radio frames. The terminal also includes a wireless transceiver coupled to the packet formatting apparatus, the wireless transceiver for communicating the radio frames over the wireless link. The data packets can be Fast Ethernet data packets. The radio frames can each have a same length and wherein the packet formatting apparatus formats the data packets into the radio frames such that boundaries for the data packets are not necessarily aligned with boundaries for the radio frames. The terminal need not convert the Ethernet data packets into a telephony communication protocol or into an asynchronous transfer mode (ATM) protocol prior to communication of the radio frames over the wireless link. The data packets can be time-division multiplexed into the radio frames. The terminal can also include a data packet synchronizer coupled to the data packet receiver and to the data packet formatting apparatus for synchronizing the data packets to a clock signal associated with the radio frames. The packet formatting apparatus can also include means for mapping portions of the radio frame to quadrature amplitude modulation symbols. The radio frames can be communicated over the wireless link according to full-duplex communication.

According to another aspect of the present invention, a method of transporting Ethernet data packets via radio frames includes steps of receiving Ethernet data packets wherein each data packet includes a data valid bit for each portion of packet data, and removing each data valid bit. The method can also include steps of formatting the Ethernet data packets according to radio frames after performing the step of removing each data valid bit, and communicating the radio frames over a wireless link. Each portion of packet data can be four bits long. The radio frames can each have a same length and wherein the step of formatting the data packets according to radio frames is performed such that boundaries for the data packets are not necessarily aligned with boundaries for the radio frames. The method can include a step of synchronizing the data packets to a clock signal associated with the radio frames. The step of formatting the data packets according to radio frames can include a step of time-division multiplexing the data packets into the radio frames.

According to yet another aspect of the present invention, a method of transporting Ethernet data packets via radio frames includes steps of receiving Ethernet data packets wherein each data packet includes a preamble and a start-of-frame delimiter, stripping off the preamble and start-of-frame delimiter, formatting the packet data according to radio frames. The step of formatting includes steps of appending a synch field to the packet data, and appending a length field to the packet data. The method can include a step of inserting a synch value which is in accordance with a Willard code into the synch field. The method can include a step of inserting a length value and an error correcting code for correcting errors in the length value into the length field. The error correcting code can be a Golay error correcting code. The radio frames can each have a same length and wherein the step of formatting the data packets according to radio frames is performed such that boundaries for the data packets are not necessarily aligned with boundaries for the radio frames. The method can include a step of synchronizing the data packets to a clock signal associated with the radio frames. The step of formatting the data packets according to radio frames can include a step of time-division multiplexing the data packets into the radio frames. The step of synchronizing can include steps of storing each portion of packet data in successive locations of a buffer, and removing the packet data from the packet buffer prior to performing the step of formatting. The radio frames can each have a same length and wherein the step of formatting the data packets according to radio frames is performed such that boundaries for the data packets are not necessarily aligned with boundaries for the radio frames. Each data packet can include a data valid bit for each portion of packet data and wherein the method further comprises a step of removing the data valid bit for each portion of packet data. Each portion of packet data can be four bits long. The method can include steps of storing the each portion of packet data in successive locations of a buffer, and removing the packet data from the packet buffer prior to performing the step of formatting. The method can include a step of storing the data valid bit for each portion of packet data in association with the four bit portion of packet data. The radio frames can each have a same length and wherein the step of formatting the data packets according to radio frames is performed such that boundaries for the data packets are not necessarily aligned with boundaries for the radio frames. The method can include a step of communicating the radio frames over the wireless link according to full-duplex communication.

The present invention provides an improvement in that conversion from the LAN protocol to an intermediate protocol is not required prior to wireless transmission. Rather, the present invention communicates data packets over a wireless link in a highly efficient manner. Thus, according to the present invention, conversion is not required to convert the LAN protocol into a telephony communication protocol, such as PDH (e.g. DS1, DS3, E1 and E3) or SDH (e.g. OC-1, OC-3), or to an asynchronous transfer mode (ATM) protocol prior to communication over the wireless link.

BRIEF DESCRIPTION OF THE DRAWINGS

FIG. 6 illustrates a radio frame according to the present invention.

DETAILED DESCRIPTION OF A PREFERRED EMBODIMENT

Figure 1:
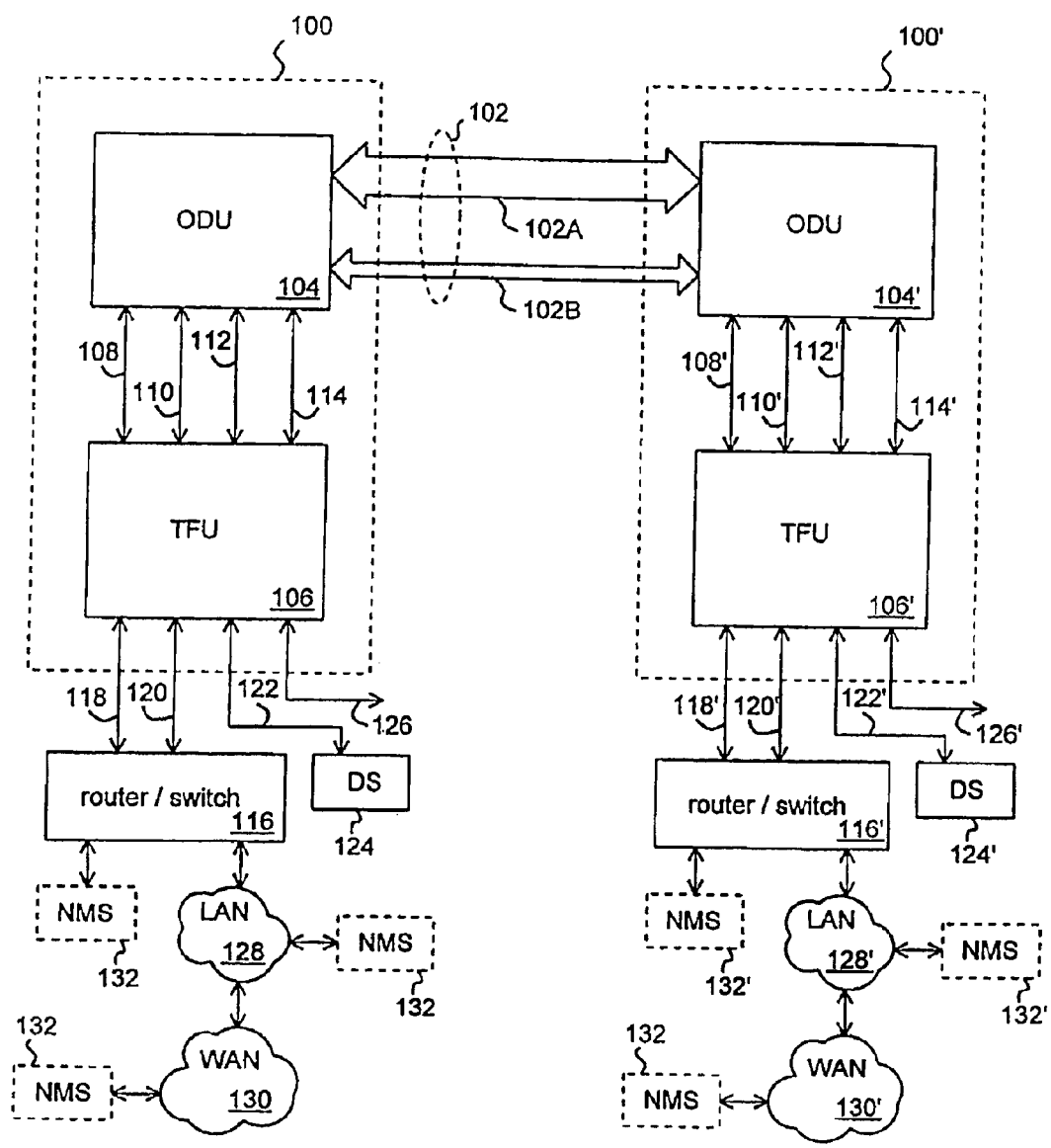
FIG. 1 illustrates a schematic block diagram of a pair of wireless terminals which communicate with each other via a wireless communication link in accordance with the present invention.
Figure 2A:
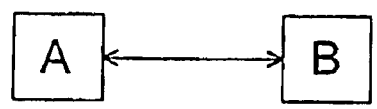
FIGS. 2A–F illustrate representative metropolitan area network (MAN) topologies according to the present invention.
Figure 2B:
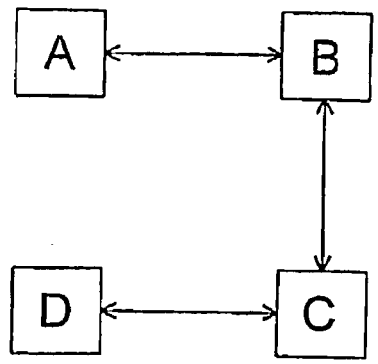
Figure 2C:
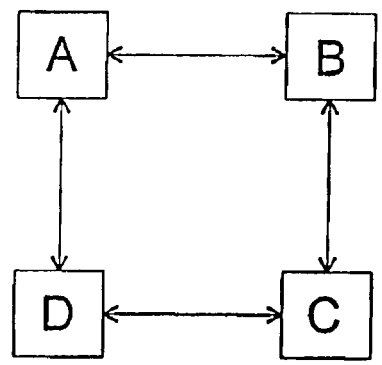
Figure 2D:
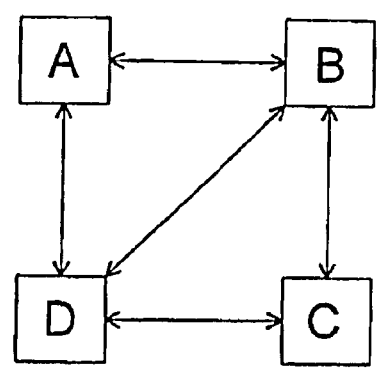
Figure 2E:
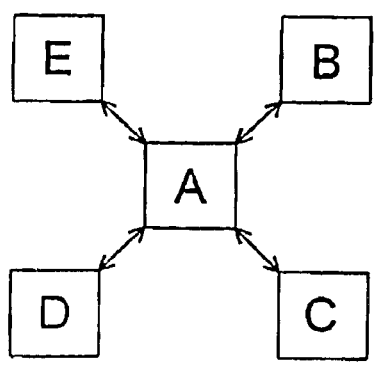
Figure 2F:
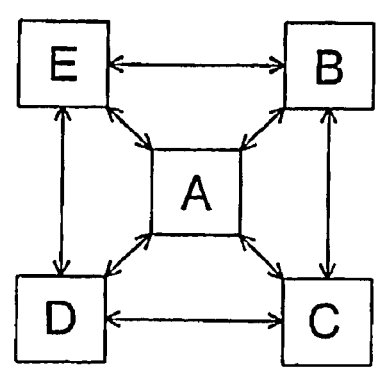

FIG. 1 illustrates a schematic block diagram of a pair of wireless terminals 100, 100' which communicate with each other via a bi-directional wireless communication link 102 in accordance with the present invention. Though a single wireless communication link 102 is illustrated, it will be apparent that a network of wireless communication links can interconnect a plurality of wireless terminals, thereby forming a wireless metropolitan area network (MAN) in accordance with the present invention. FIGS. 2A–F illustrate representative MAN topologies which interconnect wireless nodes A–E with wireless links according to the present invention. Each of the nodes A–E can include a wireless terminal identical to the terminal 100 or 100' illustrated in FIG. 1 for terminating each wireless link. It will be apparent that other MAN topologies can be implemented and that one or more of the nodes A–E can be coupled to one or more other types of networks.

Due to availability of portions of the radio spectrum in the 38 GHz frequency band, the wireless link 102 illustrated in FIG. 1 preferably operates within this frequency band, though another frequency band can be selected. Different channels within the selected band are assigned to nearby wireless links so as to reduce interference between them. The channels are preferably stepped at intervals of 25–50 MHz. Because the 38 GHz radio frequency band is susceptible to rain fade, the manner and path of transmissions via the wireless link 102 are adaptively modified for maintaining a predefined transmission quality in the network in accordance with the teachings of the parent application Ser. No. 08/950,028, filed Oct. 14, 1997, the contents of which are hereby incorporated by reference.

Referring to FIG. 1, the wireless link 102 preferably includes a primary radio channel 102A which carries full duplex 100 mega-bits-per-second (Mbps) data traffic, including payload data, and an auxiliary radio channel 102B which carries full-duplex control data for network management and control over the manner of transmission over the link 102 (link control). For example, changes to the manner of transmission initiated through link control can include changing transmission power, data bit rate, amplitude modulation scheme, spectrum spreading and transmission path.

The terminal 100 includes a broadcast device, also referred to herein as an outdoor unit (ODU) 104, which terminates one end of the wireless link 102. In the preferred embodiment, the ODU 104 includes a bi-directional radio antenna and is mounted outdoors on a roof-top mast of a building. Also included in the terminal 100 is an extender device, also referred to herein as a top floor unit (TFU) 106, which is coupled to the ODU via bi-directional communication cables 108, 110 and 112 and by power leads 114. The TFU 106 is preferably located indoors of the building having the ODU 104 located on its roof and as close as practical to the ODU 104. In preferred embodiment, the TFU 106 is located indoors, ideally in a wiring closet, on the top floor of the building. It will be apparent that the term "top floor unit", as used herein, refers to the extender unit 106 and its equivalents regardless of its location relative a building. For example, the "top floor unit" is preferably, though not necessarily, located on the top floor of a building.

The cable 108 carries full-duplex data traffic between the ODU 104 and the TFU 106 which is received from, or transmitted to, the primary radio channel 102A. The data traffic communicated via the cable 108 includes payload data for communication over the link 102 and can also include network management and control data. Preferably, data communicated via the cable 108 is in accordance with a Fast Ethernet standard, 802.3u, adopted by the Institute of Electrical and Electronics Engineers (IEEE), such as 100BASE-TX or 100BASE-T4, which operates at a data rate of 100 Mbps. The cable 110 carries half-duplex network management and control data between the ODU 104 and TFU 106. Preferably, data communicated via the cable 110 is in accordance with an Ethernet standard, such as 10BASE-T, which operates at 10 Mbps. The cable 112 carries serial data for set-up and maintenance purposes between the ODU 104 and the TFU 106. Preferably, the data communicated via the cable 112 is in accordance with conventional RS423 serial port communication protocol. The cable 114 provides supply power to the ODU 104.

Thus, in the preferred embodiment of the present invention, data is communicated between the TFU 106 and the ODU 104 via each of the cables 108, 110 and 112 according to baseband communication frequencies. This is in contrast to systems which communicate data between an indoor unit and an outdoor unit by modulating such data to intermediate frequencies (IF). The baseband communication aspect of the present invention has an advantage over such an IF modulation scheme in that implementation of the TFU 106 is simplified by the present invention. In addition, the cables 108, 110 and 112 can be of less expensive construction than would be required for IF communication.

A router or switch 116 is coupled to the TFU 106, and hence, to the terminal 100, via cables 118 and 120. The cable 118 preferably communicates data in accordance with the 100BASE-TX or T4 Fast Ethernet standard, while the cable 120 preferably communicates data in accordance with the 10BASE-T Ethernet standard. Alternately, the cable 118 can be a fiber-optic cable, in which case, it preferably communicates data in accordance with 100BASE-FX Fast Ethernet standard.

A cable 122 is coupled to a serial port of the TFU 106. Preferably, data communicated via the cable 122 is in accordance with the RS232 serial port communication protocol. A diagnostic station 124 can be coupled to the cable 122 for performing diagnostics, set-up, and maintenance of the terminal 100. Because certain aspects of the TFU 106 and ODU 104 can only be accessed from the diagnostic station 124 security over such aspects is enhanced by the requirement that the diagnostic station 124 be directly connected to the TFU 106 via the cable 122. AC power is supplied to the TFU 106 via a power supply cable 126.

A wired local area network (LAN) 128, such as an Ethernet LAN located within the building having the terminal 100, can be coupled to the router or switch 116. In addition, a wide area network (WAN) 130, such as a telephone service network which provides access to the world wide web, can be coupled to the LAN 128. Thus, the wireless link 102 can be accessed from one or more personal computers (PCs), data terminals, workstations or other conventional digital devices included in the LAN 128 or WAN 130. A network management system (NMS) 132 is coupled to any one or more of the router or switch 116, the LAN 128 or the WAN 130. The NMS 132 accesses the wireless link 102 and the terminals 100, 100' for performing network management and link control functions (e.g. collecting data regarding operation of the MAN or changing the manner of data transmission over a particular link or links). If the NMS 132 is coupled to the LAN 128, this access is through the LAN 128. If the NMS 132 is coupled to the WAN 130, however, this access is remote via direct dial-up through a telephone service provider or via access through the world wide web. When network management and link control functions are accessed via the world wide web, a web browser is provided in the NMS 132, while a web server 236 (FIG. 3) is provided in the terminal 100. In the preferred embodiment, the DS 124 and the NMS 132 are each a personal computer, but can be another type of conventional digital device.

The terminal 100' terminates the opposite end of the link 102, remote from the terminal 100. In the preferred embodiment, the link 102 can be up to 4 kilometers or more in dry climates (e.g. Wyoming) while maintaining 99.99% link availability and can be up to 1.2 kilometers or more in wetter climates (e.g. Florida) while maintaining 99.99% link availability. Elements illustrated in FIG. 1 having a one-to-one functional correspondence are given the same reference numeral, but are distinguished by the reference numeral being primed or not primed. Note, however, that because any NMS 132, 132' can access the wireless communication link 102 and both terminals 100, 100', an NMS 132 or 132' need not be located at each end of the link 102.

Figure 3:
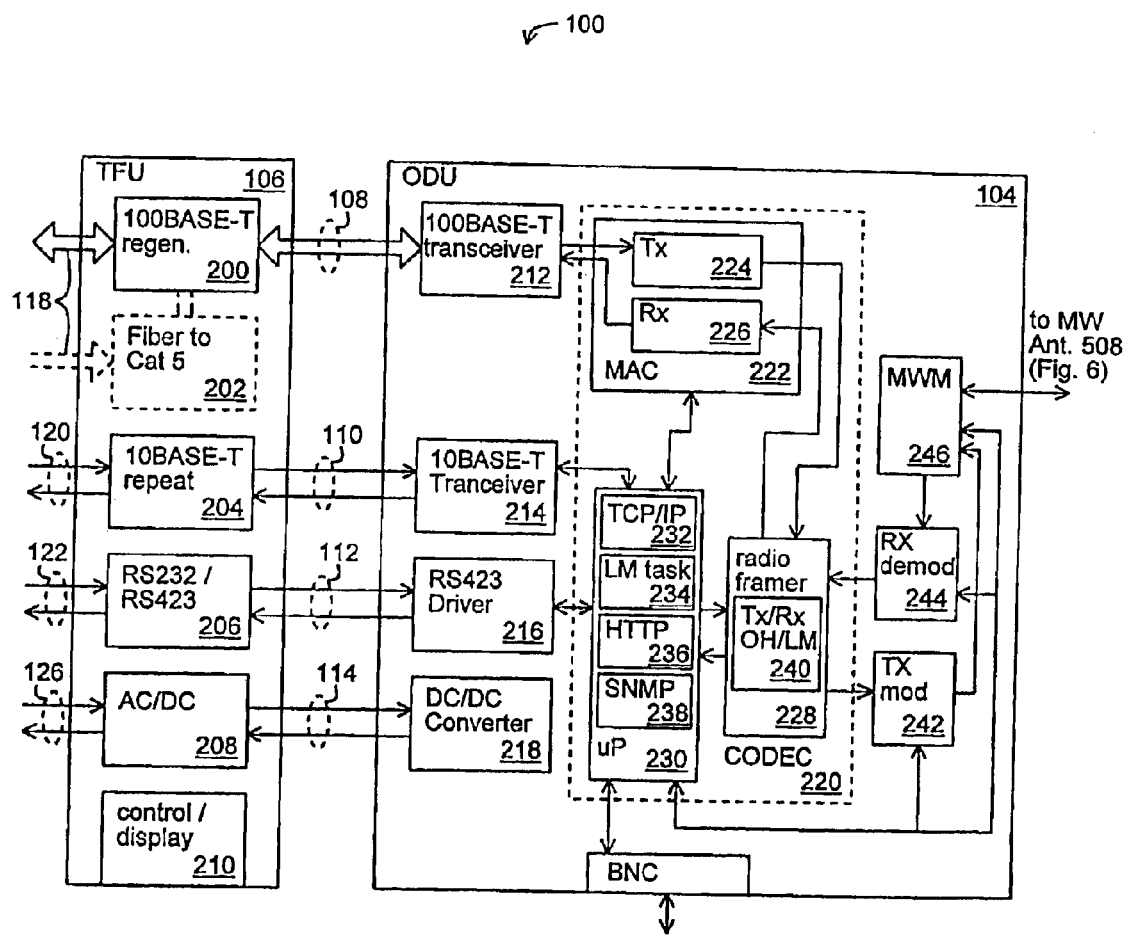
FIG. 3 illustrates a schematic block diagram of a single wireless terminal 100 in accordance with the present invention.

FIG. 3 illustrates a schematic block diagram of a single wireless terminal 100, including a TFU 106 and an ODU 104, in accordance with the present invention. The TFU 106 includes a 100BASE-T regenerator 200 which is coupled to the cable 118 (FIG. 1) and to the cable 108 (FIG. 1). In addition, assuming the cable 118 is a fiber-optic cable, the TFU 106 includes a converter 202 for converting between fiber-optic cable and Category 5 twisted pair cable. The converter 202 is coupled to the fiber-optic cable 118 and to the regenerator 200. The TFU 106 also includes a 10BASE-T repeater 204 coupled to the cable 120 (FIG. 1) and to the cable 110 (FIG. 1). A converter 206 included in the TFU 106 converts between signals in accordance with the RS232 standard and signals in accordance with the RS423 standard. The converter 206 is coupled to the cable 122 (FIG. 1) and to the cable 112 (FIG. 1).

The TFU 106 also includes an alternating-current to direct-current (AC/DC) power converter 208 coupled to the cable 126 (FIG. 1) and to the cable 114 (FIG. 2). The power converter 208 provides power to the TFU 106 and to the ODU 104. A status indicator 210 included in the TFU 106 displays status of the TFU 106 via light emitting diodes for diagnostic, set-up and maintenance purposes.

The TFU 106 provides three interfaces to customer equipment, including the router or switch 116 (FIG. 1) and the DS 124 (FIG. 1). These include a full-duplex 100 Mbps interface via the regenerator 200, a half-duplex 10 Mbps interface via the repeater 204 and an RS232 serial port via the converter 206. Though the payload data traffic is generally directed through the 100 Mbps interface while network management and link control traffic is generally directed through the 10 Mbps interface, a user of the terminal 100 can combine network management and link control signals with the payload data traffic in the 100 Mbps interface depending upon the particular capabilities of the router or switch 116 (FIG. 1).

The TFU 106 provides an interface from multiple indoor cables 118, 120, 122, 126, to a multiple outdoor cables 108, 110, 112 and 114. TFU 106 also regenerates/repeats the Ethernet signals in the form of Ethernet data packets, between the cables 108, 118 and between the cables 110, 120. Thus, the TFU 104 serves to extend the maximum distance possible between the customer equipment, such as the router or switch 116 (FIG. 1), and the ODU 104. In the preferred embodiment, a distance between the customer equipment and the TFU 106 can be up to 100 meters while a distance between the TFU 106 and the ODU 104 can also be up to 100 meters. Accordingly, in the preferred embodiment, a distance between the customer equipment and the ODU 104 can be up to 200 meters. Because data is communicated between the TFU 106 and ODU 104 at baseband frequencies, however, apparatus for performing IF modulation is not required in the TFU 106.

The ODU 104 includes a 100BASE-T transceiver 212 coupled to the cable 108, a 10BASE-T transceiver 214 coupled to the cable 110, an RS423 driver 216 coupled to the cable 112 and a DC-to-DC power converter 218 coupled to the cable 114. The 100BASE-T transceiver 212, the 10BASE-T transceiver 214, and the RS423 driver 216 are each coupled to a coder/decoder (CODEC) 220 included in the ODU 104. The power converter 218 provides power to the ODU 104.

The CODEC 220 includes a media access control unit (MAC) 222, having a transmitting portion 224 and a receiving portion 226, a radio framer 228 and a micro-processor 230 for controlling operation of the ODU 104. The transmitting portion 224 and the receiving portion 226 of the MAC 222 are coupled to the 100BASE-T transceiver 212 for communicating Ethernet data packets with the 100BASE-T transceiver 212. The radio framer 228 is coupled to the MAC 222 for translating data from the Ethernet data packets received by the MAC 222 into a radio frames 350 (FIG. 6) suitable for radio frequency modulation and transmission. The radio framer 228 also translates received radio frames 350 (FIG. 6) into packets which it provides to the MAC 222.

The micro-processor 230 is programmed by software so as to implement a TCP/IP stack 232, a link management (LM) task 234, a HyperText Transfer Protocol (HTTP) server 236 and a simple network management protocol (SNMP) agent 238. The micro-processor 230 manages each wireless link of a network of such wireless links (e.g., a MAN), including a local link 102 (FIG. 1) which is coupled directly to the terminal 100. The micro-processor 230 is accessible via any of the NMS 132 (FIG. 1) and via the DS 124 (FIG. 1). Thus, the wireless network of links can be managed locally, such as via an NMS 132 or DS 124 which is wired to the TFU 106. For this purpose, the microprocessor 230 is assigned an Ethernet (medium access control) MAC address. Alternately, the wireless network of links can be managed remotely, such as via an NMS 132 which is coupled to the WAN (FIG. 1) and which accesses the micro-processor 230 through internet access using TCP/IP (Internet Protocol). The TCP/IP stack 232 provides for this TCP/IP interface through the world wide web. For this purpose, the microprocessor 230 is assigned an internet protocol (IP) address.

The LM task 234 provides a function of changing the manner in which data is transmitted over a wireless link, initiated by one of the NMS 132, 132'. For example, the data rate for the link 102 can be changed via the LM task 132 included in the ODU 104. This can include sending a link control command over the link 102 to the ODU 104' (FIG. 1) so that both terminals 100, 100' communicate data at the same rate. Such commands are received from, and provided to, the microprocessor 230 by a overhead link management (OH/LM) module 240 included in the radio framer 228. Thus, the radio framer 228 appropriately combines network management and link control traffic provided by the LM task 234 with payload data received from the MAC 222 into radio frames 350 (FIG. 6) for communication over the link 102. In addition, the radio framer 228 extracts network management and link control traffic from radio frames 350 (FIG. 6) received from the link 102 and provides them to the LM task 234 of the microprocessor 230 via the OH/LM module 240. While two types of data traffic (payload and link control) are communicated via radio frames 350 (FIG. 6), the payload data is considered to be communicated via the primary channel 102A, while the link control traffic considered to be communicated via the auxiliary channel 102B. Accordingly, these two channels 102A and 102B are time-division multiplexed.

A graphical user interface by which the micro-processor 230 can be accessed from an NMS 132, 132' (FIG. 1) or DS 124, 124' (FIG. 1) for network management and link control purpose, is preferably achieved by the HTTP web server software module 236 which is implemented by the microprocessor 230 located in the ODU 104 and which is assigned a unique IP address. The server software 236 operates in conjunction with the TCP/IP stack 232. According to this aspect of the invention, the server software 236 is utilized for providing a graphical user interface for through which network management functions are initiated. These functions include retrieving data representative of network conditions in the MAN and changing the manner in which data is transmitted across a wireless link of the MAN.

Thus, functions for managing the MAN and its wireless links can be accessed and initiated from network management stations 132, 132' (NMS) located in various portions of the MAN, utilizing web browser software resident in the NMS 132, 132'. This graphical user interface provides a user friendly environment which can operate on, and be accessed by, a variety of different NMS's obtained from a variety of different manufacturers. For example, an NMS 132, 132' can be a workstation manufactured by Sun Microsystems, a PC manufactured by any one of a variety manufacturers or even a set-top box used in conjunction with a television set. Compatibility with the web server is achieved via commercially available web browser software resident in the NMS 132, 132'. This aspect of the present invention addresses compatibility issues between the NMS 132, 132', and the terminal 100, 100'.

The SNMP agent 238 located in the ODU 104 maintains a management information database (MIB statistics) which is a collection of managed objects that correspond to resources of the MAN and of the terminal 100. The SNMP agent 238 can access the MIB to control certain aspects of the MAN and the terminal 100 and can query the MIB for information relating to the managed objects. The SNMP is accessible through the HTTP server 236.

The ODU 104 also includes a transmit modulator (TX mod) 242, a receive demodulator (RX demod) 244 and a microwave module (MWM) 246. The transmit modulator 242 translates from digital baseband output data received from the radio framer 228 to analog waveforms suitable for up-conversion to microwave frequencies and eventual transmission over the wireless link 102. The analog waveforms formed by the transmit modulator 242 preferably modulate a 490 MHz IF carrier. It will be apparent, however, that a frequency other than 490 MHz can be selected for this purpose.

The receive demodulator 244 performs functions which are essentially the opposite of those performed by the transmit modulator 242. In the preferred embodiment, the receive demodulator 244 receives a 150 MHz IF signal from the microwave module 246. It will be apparent, however, that a frequency other than 150 MHz can be selected for this purpose. The receive demodulator 244 controls the level of the this signal via automatic gain control (AGC) and, then, down-converts the signal to baseband according to coherent carrier recovery techniques and provides this down-converted signal to the radio framer 228.

The microwave module 246 performs up-conversion to microwave frequency on the 490 MHz IF output signal generated by the transmit modulator 242 and provides this up-converted signal to a microwave antenna 508 (FIG. 12) which transmits the data over the link 102. In addition, the microwave module 246 receives a microwave frequency signal from the link 102, down-converts this signal to a 150 MHz IF signal and, then, provides this down-converted signal to the receive demodulator 244.

Figure 4:
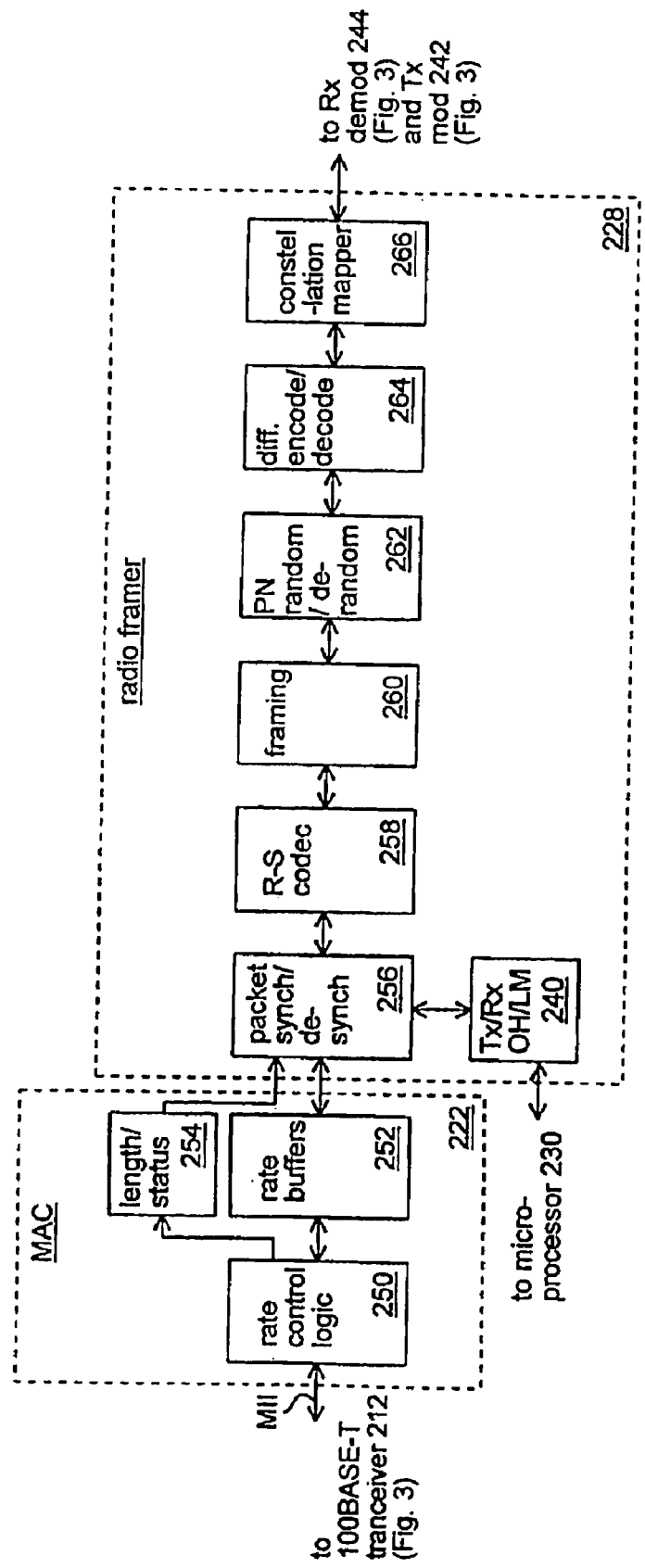
FIG. 4 illustrates a schematic block diagram of the digital signal processing MAC and radio framer included in the CODEC illustrated in FIG. 2.

FIG. 4 illustrates a schematic block diagram of the digital signal processing MAC 222 and radio framer 228 included in the CODEC 220 illustrated in FIG. 2. The MAC 222 includes rate control logic 250 and rate buffers 252. The rate control logic 250 receives 100BASE-T Ethernet data packets at 100 Mbps from the 100BASE-T Transceiver 212 (FIG. 3) via a media independent interface (MII) between the MAC 222 and the transceiver 212.

Note that 100BASE-T Ethernet data packets are provided to the transceiver 212 (FIG. 3) as a serial data stream. In accordance with the IEEE 802.3u standard, the serial data stream is encoded utilizing a 4B/5B scheme. According to the 4B/5B scheme, each four-bit portion (nibble) of each 100BASE-T data packet is accompanied by a 1-bit data valid field. Thus, due to the data valid bits, the wire speed for 100BASE-T is actually 125 Mbps, though the serial data communication rate is 100 Mbps assuming the data valid bits are discounted. The transceiver 212 converts this serial data stream into parallel four-bit portions of data (nibbles), a data valid signal (RX_DV) and also recovers a clock signal from the data stream. The nibbles, data valid signal and clock signal are provided to the MAC 222 by the transceiver via the MII interface.

The data nibbles, data valid signal and recovered clock signal are then synchronized to a locally generated clock signal. This locally generated clock signal preferably operates at 27.5 Mhz and is derived from a 55 MHz and 10 parts-per-million accuracy crystal oscillator located within the CODEC 220 (FIG. 3). The rate control logic 250 detects each 100BASE-T Ethernet data packet received from the transceiver 212. In the preferred embodiment, the rate control block 250 then checks each such 100BASE-T Ethernet data packet for errors utilizing the frame check sequence (FCS) appended to each 100BASE-T Ethernet packet and strips each 100BASE-T Ethernet data packet of its preamble and start-of-frame delimiter (the frame-check sequence FCS for each 100BASE-T Ethernet packet is preferably retained). The rate control logic 250 also converts each Ethernet data packet from nibbles to bytes.

The rate control logic 250 calculates the length of each detected 100BASE-T Ethernet data packet. The rate control logic 250 also determines whether the packet is too long, too short (a runt packet) or is misaligned.

The rate control logic 250 then temporarily stores the packets in rate buffers 252. In the preferred embodiment, the bytes for each packet are clocked into the rate buffers 252 according a clock signal recovered from the data. The rate buffers 252 preferably include two first-in, first-out (FIFO) buffers having 16K entries, one for packets being transmitted and one for packets being received. The FIFO buffers each preferably provides sufficient storage for each entry so that additional information can be stored in the rate buffers 252 along with the byte of data. Such additional information preferably includes the data valid bit for each nibble and an indication of whether the nibble is payload data or overhead for the 100BASE-T Ethernet packets. For example, the overhead can include inter-packet gaps codes (e.g. one byte/octet of all zeros with associated data valid bits de-asserted), and start-of-packet codes. Assuming inter-packet gap codes are stored, preferably only one inter-packet gap code, representative of the minimum required inter-packet gap (e.g. of 0.96 μs), is stored in the rate buffers 252.

The rate control logic 250 then records the previously determined length of the 100BASE-T Ethernet data packet in a length and status FIFO buffer 254. In addition, the rate control logic 250 stores an indication of the status of the packet (e.g. too long, too short or misaligned) in the length and status buffer 254.

The radio framer 228 is coupled to the MAC 222 and includes the OH/LM block 240 (FIG. 3), a packet synch/de-synch block 254, a Reed-Solomon encoder/decoder (R-S codec) 258, a framing block 260, a pseudo-random number (PN) randomizer/de-randomizer block 262, a differential encoder/decoder 264 and a constellation mapper 266.

The packet synch/de-synch block 256 retrieves the stored 100BASE-T Ethernet data packets from the rate buffers 252 at an appropriate rate which depends, in part, upon the data transmission rate utilized for sending data over the wireless link 102. In the preferred embodiment, removal of data from the rate buffers 252 for an Ethernet packet is not initiated until the packet has been completely stored. During periods when a complete packet is not available from the rate buffers 252, then an inter-packet gap code is substituted by the packet synch/de-synch block 254.

Figure 5:
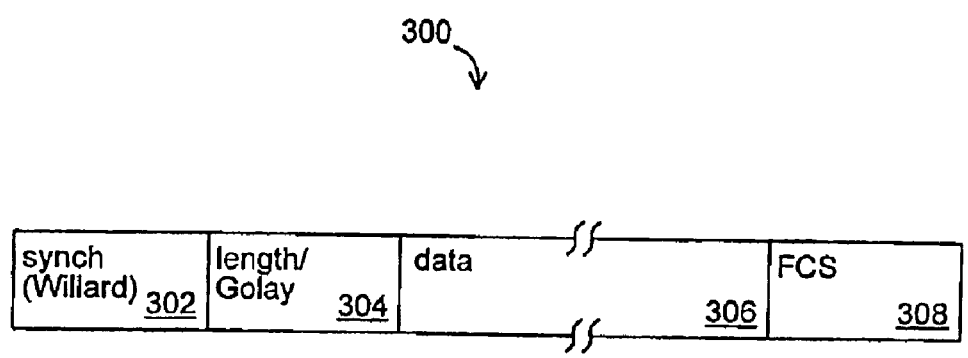
FIG. 5 illustrates a frame structure for reformed 100BASE-T Ethernet data packets according to the present invention.

In the preferred embodiment of the present invention, the packet synch/de-synch block 256 reforms the 100BASE-T Ethernet data packets according to a reformed frame structure 300 for 100BASE-T Ethernet data packets illustrated in FIG. 5. The reformed frame structure 300 includes a synch pattern field 302, a length field 304, a data field 306 and a frame check sequence (FCS) field 308.

Recall that the rate control logic 250 (FIG. 4) strips each 100BASE-T Ethernet data packet of its preamble and start-of-frame delimiter prior to storing the packet in the rate buffers 252. Upon retrieving each packet from the rate buffers, the packet synch/de-synch block 256 adds a synch pattern in field 302 and a length value in field 304 to the packet. The length value is retrieved from the length and status buffer 254.

Figure 6:
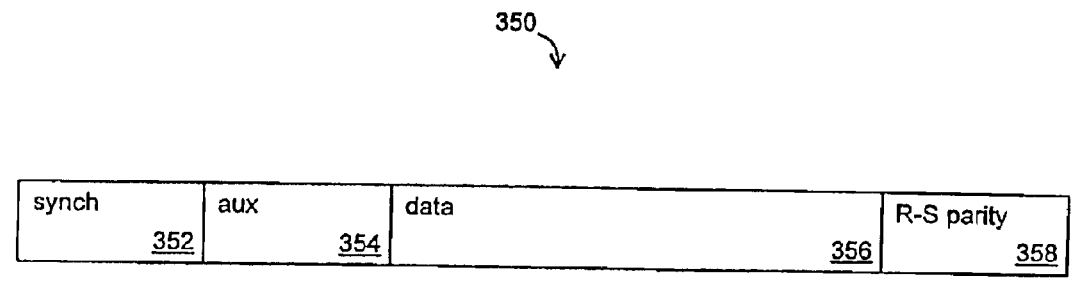

In the preferred embodiment, finite state machines control the synch/de-synch block 256 so as to enable the retrieval of 100BASE-T Ethernet packets from the rate buffers 252 along with the length and status of each, at a appropriate frequency for forming radio frames 350 (FIG. 6). A store and forward technique is applied to 100BASE-T Ethernet packets which pass through the transmit portion of the rate buffers 252. Thus, data packets to be transmitted across the wireless link 102 are completely received into the rate buffers 252 and stored therein prior to being formed into a radio frame 350. A cut-through technique, however, is preferably applied to 100BASE-T data packets which pass through the receive portion of the rate buffers 252. Thus, data packets received from the wireless link 102 are forwarded to the transceiver 212 (FIG. 3) as they received without storing the entire data packet in the rate buffers 252.

Table 1 shows the particular bit values for the synch pattern field 302 and for the length value field 304 according to the preferred embodiment of the present invention.

TABLE 1

| Synch Field 302 | | | | | Packet Length Field 304 | | | |
|---|---|---|---|---|---|---|---|---|
| octet 1 | octet 2 | octet 3 | octet 4 | octet 5 | octet 1 | octet 2 | octet 3 | Bit |
| 1 | 1 | 0 | 1 | 0 | G[11] | G[7] | G[3] | 7 |
| 1 | 1 | 0 | 1 | 0 | G[10] | G[6] | G[2] | 6 |
| 0 | 0 | 1 | 0 | 1 | G[9] | G[5] | G[1] | 5 |
| 1 | 1 | 0 | 1 | 0 | G[8] | G[4] | G[0] | 4 |
| 0 | 0 | 1 | 0 | 1 | 0 | L[7] | L[3] | 3 |
| 1 | 1 | 0 | 1 | 0 | L[10] | L[6] | L[2] | 2 |
| 1 | 1 | 0 | 1 | 0 | L[9] | L[5] | L[1] | 1 |
| 0 | 0 | 1 | 0 | 1 | L[8] | L[4] | L[0] | 0 |

As shown in Table 1, the synch pattern placed in the synch field 302 is preferably a five-octet (five-byte) pattern defined by a five-bit Willard code [11010]. Essentially, the Willard code is repeated for each octet, but is inverted for two of the five octets. The length value placed in the length field 304 is preferably an eleven-bit value L[10:0] which specifies the number of octets (bytes) of payload data contained in the data field 306. Thus, the length value L[10:0] can vary for each packet depending upon the length of the data payload included in the 100BASE-T Ethernet packet. In the preferred embodiment, a twelve-bit Golay check sum G[11:0] for the length value is stored along with the length value in the length field 304, as shown in Table 1. Because the length field 304 is preferably three octets (three bytes) a value of zero (0) is used a place holder between the length value L[10:0] and the Golay check sum G[11:0].

Referring to FIG. 5, the data payload from the Ethernet packet is stored in the data field 306. Note that 100BASE-T Ethernet data packets are conventionally of variable length. In particular, the data payload portion for a conventional 100BASE-T Ethernet packet can vary between 64 and 1518 octets (bytes). Thus, the length of the data field 304 can vary between 64 and 1518 bytes.

An important aspect of the reformation of the Ethernet data packets in the reformed frame structure 300 is the omission of the 1-bit data valid field for each nibble of the Ethernet packet. Rather, the nibbles are placed contiguously in the data field 306. This omission of the data valid bits results in a significant savings in bandwidth required for transmitting the reformed packet frame 300 over the wireless link 102 in comparison to also transmitting the data valid bits over the wireless link 102. The FCS sequence is retained for each Ethernet packet and placed in the FCS field 308.

The packet synch/de-synch block 256 also receives link control data from the OH/LM 240 and for combining this link control data with the reformed packet frames 300 to be communicated over the link 102.

The R-S codec 258 receives the reformed data packet frames 300 and link control commands from the packet synch/de-synch block 256 and performs Reed-Solomon (R-S) forward error correction coding. The R-S encoded data is then provided to the framing block 260 where the R-S encoded data is formatted according to radio frames 350 (FIG. 6).

FIG. 6 illustrates a radio frame 350 according to the present invention. The radio frame 350 includes a synch field 352 for synchronizing a receiver to the radio frame 350, an auxiliary field 354 for network management and link control traffic which is received from the OH/LM 240 to be communicated over the auxiliary channel 102B of the wireless link 102, a data field 356, and an R-S parity field 358. The value placed in the synch field is preferably 47 hex.

In the preferred embodiment, radio frames 350 are continuously formed and transmitted across the wireless link 102 whether or not data from a complete Ethernet packet is queued in the rate buffers 252 (FIG. 4) to be placed in reformed packet frames 400. During periods when no reformed packet frames are available, the data field 356 of the current radio frame 350 is loaded with idle code (all zeros). Similarly, during periods when no network management commands are queued to be communicated via the auxiliary channel 102B, then the auxiliary field 354 is loaded with idle code (all zeros).

Recall that reformed packet frames 300 have variable length according to the preferred embodiment of the present invention. The data field 356 of each radio frame 350, however, preferably has a fixed length according to the preferred embodiment of the present invention. Accordingly, the R-S encoded data from the R-S codec 258 is placed contiguously in the data field 356 of each radio frame 350 such that reformed data frame 300 boundaries do not have a predefined relationship to radio frame 350 boundaries. For example, a reformed data frame 300 can span multiple radio frames 350. Alternately, up to three complete smaller reformed data frames 300 can be included in a single radio frame 350. Further, during idle periods between communication of reformed packets, an idle code is preferably transmitted as a place holder within the data field 356 of each radio frame 350 to meet the timing requirements needed to synchronize 100BASE-T Ethernet data packets.

Figure 7:
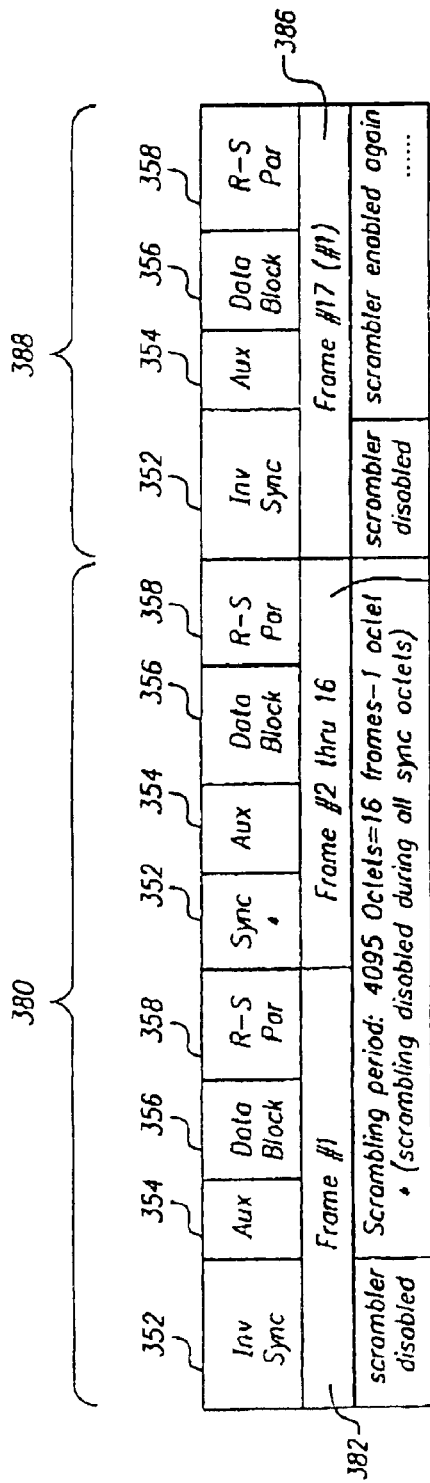
FIG. 7 illustrates a radio super frame according to the present invention.

As radio frames 350 are formed, multiples of the radio frames 350 are combined to form a radio "super frame" 380 (FIG. 7). FIG. 7 illustrates a radio super frame 380 according to the present invention. In the preferred embodiment, each radio super frame 380 includes 16 consecutive radio frames 350 (FIG. 6). For the first radio frame 382 of the super frame 380, the value placed in the synch field 352 is inverted (changed to B8 hex). In the second through sixteenth radio frames 384, however, the value placed in the synch field 352 remains unchanged. The value placed in the synch field 352 of the first radio frame 386 for a next radio super frame 388, is also inverted. This inversion of the synch value for the first radio frame 350 of each radio super frame 380 allows the radio super frames 500 to be detected after reception.

The radio super frame 380 is provided to the PN randomizer/de-randomizer 262. The PN randomizer/de-randomizer 262 performs quadrature amplitude modulation (QAM) scrambling on the entire radio super frame 380 except for the inverted synch values placed in the first synch field 352 of each super frame 380. By disabling the PN randomized de-randomizer 262 for the inverted synch values, the scrambled super frame 380 can be detected upon reception. In preferred embodiment, the scrambling operation maps each octet (byte) of the radio super frame 380 (other than the inverted synch values) to a two successive four-bit symbols utilizing a 13th order polynomial, as shown by the schematic block diagram of the PN randomizer/de-randomizer 262 according to the preferred embodiment of the present invention.

Figure 8:
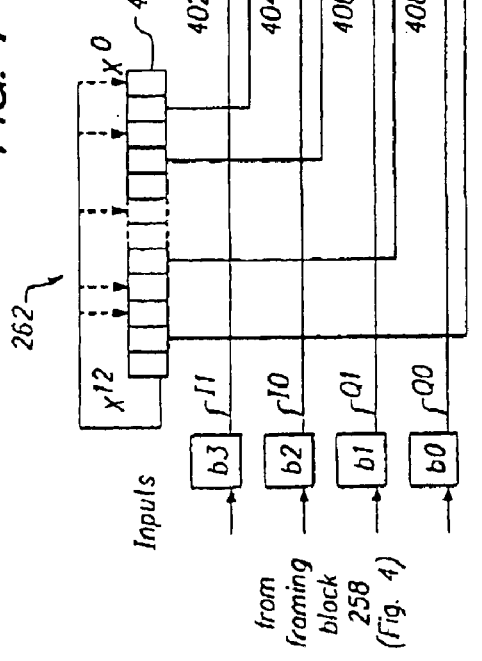
FIG. 8 illustrates a schematic block diagram of a symbol scrambler according to the present invention.

Referring to FIG. 8, each octet of the radio super frame 380 (other than the inverted synch values) is divided into two successive four-bit portions B[3:0] which are applied to the correspondingly labelled inputs illustrated in FIG. 8. These inputs correspond to in-phase and quadrature (I&Q) symbol components I1, I0, Q1, Q0. A feedback shift register 400 generates the specified 13th order polynomial. Contents of selected memory cells of the feedback shift register 400 are exclusive-OR'd by logical exclusive-OR blocks 402, 404, 406, and 408 with each four bit portion b[3:0] of the radio frame. Outputs of the exclusive-OR blocks 402, 404, 406 and 408 form I&Q symbol components I1', I0', Q1', Q0'.

Figure 9:
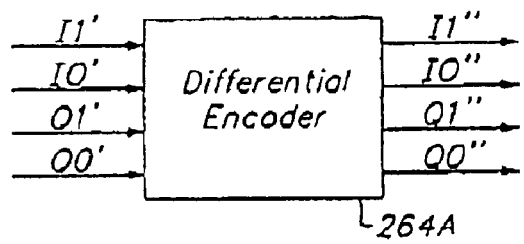
FIG. 9 illustrates a schematic block diagram of a differential encoder and characteristic equations according to the present invention.

The symbol components I1', I0', Q1', Q0', are applied to the differential encoder/decoder block 264 (FIG. 4). FIG. 9 illustrates a schematic block diagram of a differential encoder 264A included in the differential encoder/decoder block 264 (FIG. 4) and characteristic equations according to the present invention. The encoder 264A forms signal components I1", I0", Q1", Q0". In the preferred embodiment, the encoder 264A is implemented by an appropriately preconditioned look-up table.

Figure 10:
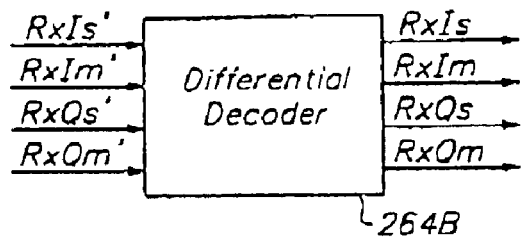
FIG. 10 illustrates a schematic block diagram of a differential decoder and characteristic equations according to the present invention.

The differential encoder encodes the scrambled symbols from the PN randomizer/de-randomizer 262 such that quantum-phase differencing of the transmitted symbols according to modulo-π/2 recovers the original un-encoded data, independent of which of the four possible quantum-phase alignments is selected in the decoder 264B illustrated in FIG. 10.

FIG. 10 illustrates a schematic block diagram of the differential decoder 264B included in the differential encoder/decoder 264 (FIG. 4) and characteristic equations according to the present invention. In the preferred embodiment, the differential decoder 264B is implemented by an appropriately preconditioned look-up table.

The symbol components I1", I0", Q1", Q0',' formed by the encoder 264A are applied to the constellation mapper 266 (FIG. 4). The constellation mapper 266 maps four-bit portions of the radio frame 350 to sixteen different symbols, as shown in FIG. 11, according to quadrature amplitude modulation techniques (16 QAM).

Figure 11:
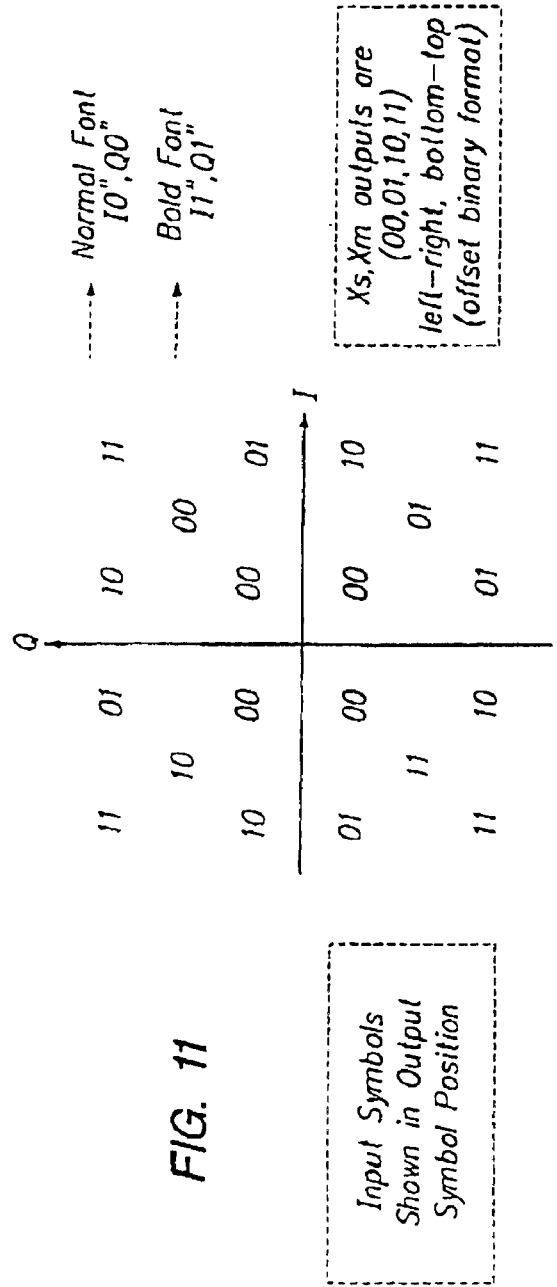
FIG. 11 illustrates a mapping constellation for a constellation mapper according to the present invention.

FIG. 11 illustrates a mapping constellation for the constellation mapper 266 (FIG. 4) according to the present invention. In the preferred embodiment, this constellation is defined by a standard adopted by the Digital Audio Visual Counsel (DAVIC). The input symbol components I1", I0", Q1", Q0", are mapped to the output symbol components Is, Im, Qs, Qm, as shown in Table 2. The mapped symbols are then provided by the constellation mapper 266 (FIG. 4) to the transmit modulator 242 (FIG. 3).

TABLE 2

| I1", I0", Q1", Q0" (input) | Is, Im, Qs, Qm (output) |
| --- | --- |
| 0000 | 1010 |
| 0001 | 1110 |
| 0010 | 1001 |
| 0011 | 1000 |
| 0100 | 1011 |
| 0101 | 1111 |
| 0110 | 1101 |
| 0111 | 1100 |
| 1000 | 0110 |
| 1001 | 0111 |
| 1010 | 0101 |
| 1011 | 0001 |
| 1100 | 0010 |
| 1101 | 0011 |
| 1110 | 0100 |
| 1111 | 0000 |

Received radio super frames 380 (FIG. 7) are provided to the constellation mapper 266 (FIG. 4) from the receive de-modulator 244 (FIG. 3). During radio super frame 380 reception, each radio super frame 380 is converted back from the symbols Is, Im, Qs, Qm, into the symbol components I1", I0", Q1", Q0', by the constellation mapper 262 performing a reverse of the mapping operation according to the relationships shown in Table 2.

In the preferred embodiment of the present invention, the QAM format can be altered dynamically under control of the microprocessor 230 based upon rain fade or interference detected through bit error rates (BER) or upon receiving a link control command. For example the QAM format can be dynamically altered from 16 QAM to 4 QAM. Alternately, the QAM format can be changed from 16 QAM to 4 QAM and with the application of spectrum spreading. As a result, the data transmission bit rate falls, however, the error rate would be expected to fall also. Conversely, the QAM format can be dynamically altered from 16 QAM to 64 QAM which results in a higher data transmission bit rate.

Then, the differential decoder 264B (FIG. 10) decodes the symbol components I1", I0", Q1", Q0", into the symbol components I1', I0', Q1', Q0'. Next, the radio super frame 380 is detected by the inverted synch values for the first radio frame of each super frame 380. The symbol components I1', I0', Q1', Q0', are then provided to the PN randomizer/de-randomizer 262 (FIG. 4) which converts them to the back into the original two successive four-bit portions b[3:0] for each octet of each radio frame 350 (FIG. 6) of the radio super frame 380 (FIG. 7).

The radio frame 350 is then synchronized to the radio super frame 380 by detecting the non-inverted synch value in the field 352 (FIG. 6) for each radio frame 350. Forward error correction is performed by the R-S codec 258 (FIG. 4). For each radio frame 350 having an error which is uncorrectable by the R-S codec 258, the R-S codec 258 provides an indication, preferably by setting a flag, which is stored in the rate buffers 252 along with the affected packet data. For each Ethernet packet formed by the rate control logic 250 which is affected by such an uncorrected error as flagged by the R-S codec 258 (FIG. 4), the transmit error signal TX ER provided to the transceiver 212 (FIG. 3) via the MII interface, is asserted. A link-layer response can then be applied to cause the packet to be resent.

The reformed data frames 300 are then passed from the R-S codec to the packet synch/de-synch block 256. In the packet synch/de-synch block 256, the reformed data frames 300 (FIG. 5), as well as network management and control data, are detected and extracted from the radio frame 350 structure. For the reformed data frames 300, this is accomplished by a windowed search technique which utilizes matched filter correlation. The search technique is utilized to locate the five-octet synch value in the synch field 302 (based on the Willard code) for each reformed data frame 300. When packet synchronization is maintained, the search window preferably encompasses only inter-packet gap periods (when the data field 356 of the radio frame 350 contains the idle code). During periods when packet synchronization is not detected, however, the search window is expanded to encompass the entire packet. Once synchronization is obtained, the window is again reduced.

Correlation searching is performed by the packet synch/de-synch block 256 utilizing a matched filter which performs correlation on an octet-by-octet basis. Accumulation by addition is performed on 40 bits of data at a time (5 bytes), as octets slide through the matched filter. The accumulated value is compared to a predetermined threshold for each octet. When the threshold is exceeded, the start of a reformed data frame 300 is indicated.

Once a synch value is detected, the length value for the packet and Golay code are read from the length field 304. The length value is verified utilizing the Golay code. If necessary, the length value is corrected utilizing the Golay code. If the length value is corrupted and uncorrectable, however, the packet is disregarded while searching for a next synch value continues.

Assuming the length value is correct or correctable, the reformed data frame 300 is loaded to the rate buffers 252 by the packet synch/de-synch block 256 in eight-bit portions (bytes) for processing into a 100BASE-T Ethernet packet. From the length value, the data valid bit for each byte is also re-generated and stored in the rate buffers 252. A single inter-packet gap code is stored in the rate buffers 252 to separate each packet. Network management and link control data from the auxiliary field 354 of each received radio frame 350 is provided to the microprocessor 230 (FIG. 3) through time-division de-multiplexing.

Then, searching for a next synch value is disabled until the end of the reformed data frame 300, as indicated by the correct or corrected length value.

Reformed data frames 300 are retrieved from the packet buffer 252 under control of the rate control logic 250 and returned to conventional 100BASE-T Ethernet format for the MII interface with the transceiver 212 (FIG. 3). This is accomplished by restoring the preamble and start-of-frame delimiter for each 100BASE-T Ethernet packet. Then, the conventional 100BASE-T Ethernet packets are provided to the 100BASE-T transceiver 212 (FIG. 3) at a rate appropriate to the 100BASE-T transceiver 212. The 100BASE-T transceiver 212 then communicates the packets to the TFU (FIGS. 1 and 3). In the preferred embodiment, the rate control logic 250 includes a finite state machine for performing the function of retrieving the Ethernet packets from the rate buffers 252 and providing them to the 100BASE-T transceiver 212. Thus, the rate control logic 250 synchronizes the packets to a clock signal utilized for communication of the 100BASE-T data packets with the locally generated clock signal which is utilized for forming and communicating radio frames 350 (FIG. 6).

Referring to FIGS. 3 and 4, in the preferred embodiment, the transmit modulator 242 receives four-bit symbols from the constellation mapper 266 of the radio framer 228 in the CODEC 220 at 27.5 Mbaud. Each symbol is converted to a complex in-phase and quadrature (I&Q) voltage and, then, pulse-shaped utilizing a square-root cosine filter in the transmit 11 modulator 242. Finally, the symbol modulates a 490 MHz intermediate frequency (IF) output signal. The output level of the signal formed by the transmit modulator 242 is selectively adjustable over a continuous range under control of the micro-processor 230. Adjustments in the output level are preferably made in response to detected rain fade, detected interference or in response to a link control command. The modulated IF signal formed by the transmit modulator 242 is supplied to the microwave module 246.

The receive demodulator 244 preferably includes a 0-dB/20-dB IF attenuator in the receive path which is selectable under control of the micro-processor 230 depending upon the range of the link 102. Typically, this attenuator is set for 0-dB. For link ranges of less than approximately 50 meters, however, the attenuator is preferably set for 20-dB attenuation. The receive demodulator 244 performs adaptive slope equalization to minimize effects of distortion caused by transmission over the link 102. Further, the receive demodulator 244 preferably also includes an adaptive time-domain equalizer to perform symbol synchronization, and a matched-filter square-root-raised-cosine process is applied to minimize inter-symbol interference.

Figure 12:
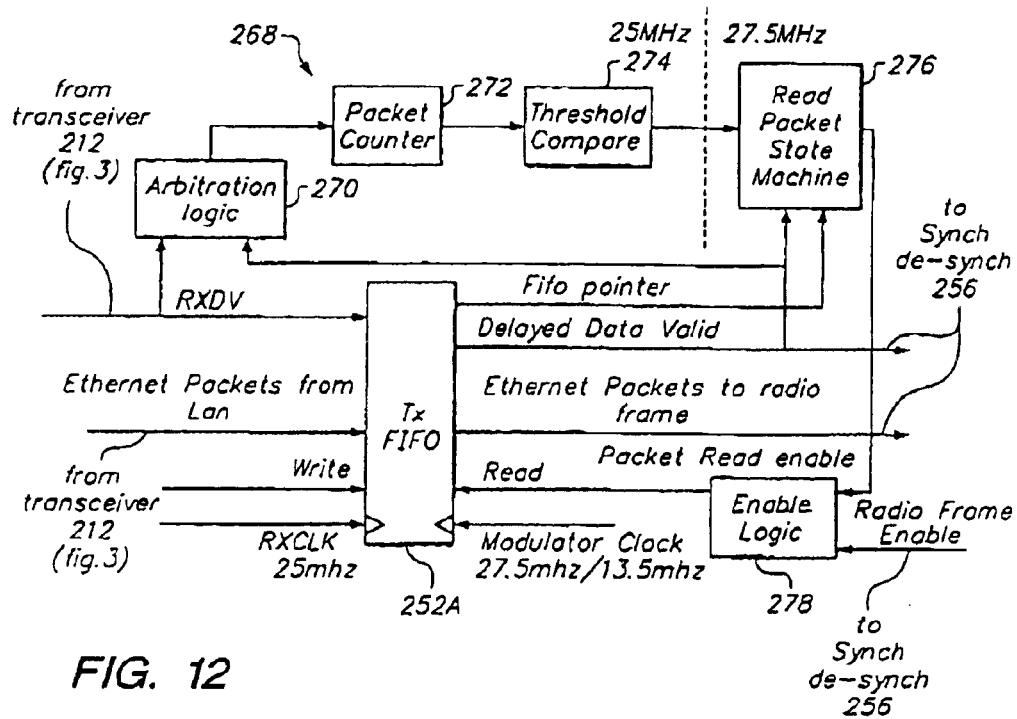
FIG. 12 illustrates a schematic block diagram of an Ethernet-to-radio frame synchronizing portion of the rate control logic according to the present invention.

FIG. 12 illustrates a schematic block diagram of an Ethernet-to-radio frame synchronizing portion 268 of the rate control logic 250 (FIG. 4) and transmit buffer 252A according to the present invention. The transmit buffer 252A forms a portion of the rate buffers 252 (FIG. 4). 100BASE-T Fast Ethernet packets and a receive data valid signal RXDV are received into the transmit buffer 252A from the transceiver 212, as explained above in reference to FIG. 4. In addition, a clock signal at 25 MHz is derived from the incoming data packet and utilized for clocking the incoming Ethernet data packets into the transmit buffer 252A.

The receive data valid signal RXDV is provided to a first input of an arbitration logic block 270. In response to a complete Ethernet packet being stored in the transmit buffer 252A, as indicated by the data valid signal RXDV, the arbitration logic 270 instructs a packet counter 272 to increment a count by one. As Ethernet packets are retrieved from the transmit buffer 252A, a delayed data valid signal is also retrieved from the transmit buffer 252A. This delayed data valid signal is applied to a second input to the arbitration logic block 270. In response to a complete Ethernet data packet being removed from the transmit buffers 252A as it is supplied to the synch/de-synch logic block 256, as indicated by the delayed data valid signal, the arbitration logic block 282 instructs the packet counter 272 to decrement the count by one. Thus, the packet counter 272 maintains a current count of complete Ethernet data packets in the transmit buffer 252A.

This count is provided by the packet counter 272 to a threshold compare block 274. The threshold compare block 274 notifies a read packet state machine 276 when a sufficient number of complete Ethernet packets are stored in the transmit buffer 252A to initiate retrieval of the packets from the transmit buffer 252A. In the preferred embodiment, only one complete Ethernet packet need be stored in the transmit buffer 252A to initiate the read packet state machine 276 to retrieve the packet. Once initiated to retrieve a packet, the read state machine 276 activates a first input to a logic AND gate 278. A second input to the logic AND gate 278 receives a read frame enable signal from the synch/de-synch logic 256 (FIG. 4). This read frame enable signal is activated when the synch/de-synch logic 256 is ready to receive the Ethernet packet data for insertion into a radio frame 350 (FIG. 6).

An output of the logic AND gate 278 is coupled to a read input of the transmit buffer 252A for retrieving the packet from the transmit buffer 252A. As it is being retrieved, the packet is provided to the synch/de-synch logic 256.

An important aspect of the Ethernet-to-radio frame synchronizing portion 268 of the rate control logic 250 (FIG. 4) is that it synchronizes the receiving of Ethernet data packets according to 25 MHz clock signal which is asynchronous with the locally generated clock signal. Note that the 25 MHz clock signal is derived from the incoming Ethernet data packets and is applied to the transmit buffer 252A for storing the packet data while the locally generated clock signal is applied to the transmit buffer 252A for retrieving Ethernet packet data from the transmit buffer. Thus, the arbitration logic, packet counter 272 and threshold compare logic 274 operate according to the derived 25 MHz clock, while the read packet state machine 276 and the radio framer 228 (FIG. 4) operate according to the locally generated clock.

In the preferred embodiment, the locally generated clock signal is 27.5 MHz. Because the locally generated clock signal is at a higher rate than the clock signal derived from the incoming Ethernet packets, in absence of the synchronizing portion 268 of the rate control logic 250, it would be possible for the transmit buffer 252A to become empty while an Ethernet packet is still being received into the transmit buffer 252A. Thus, the synchronizing portion 268 of the rate control logic 250 avoids this potential problem.

Assuming that an adaptive counter measure is employed which reduces the rate at which radio frames 350 (FIG. 6) are formed, this also reduces the rate at which the data from Ethernet packets is retrieved from the transmit buffer 252A. Assuming this rate is below 25 MHz (e.g. 13.75 MHz), then a complete packet need not be stored in the transmit buffer 252A prior to initiating retrieval of such a packet. In the preferred embodiment, under such circumstances, cut-through is employed wherein the incoming Ethernet data packet is supplied to the radio framer 228 (FIG. 4) prior to the complete packet being received into the transmit buffer 252A.

Figure 13:
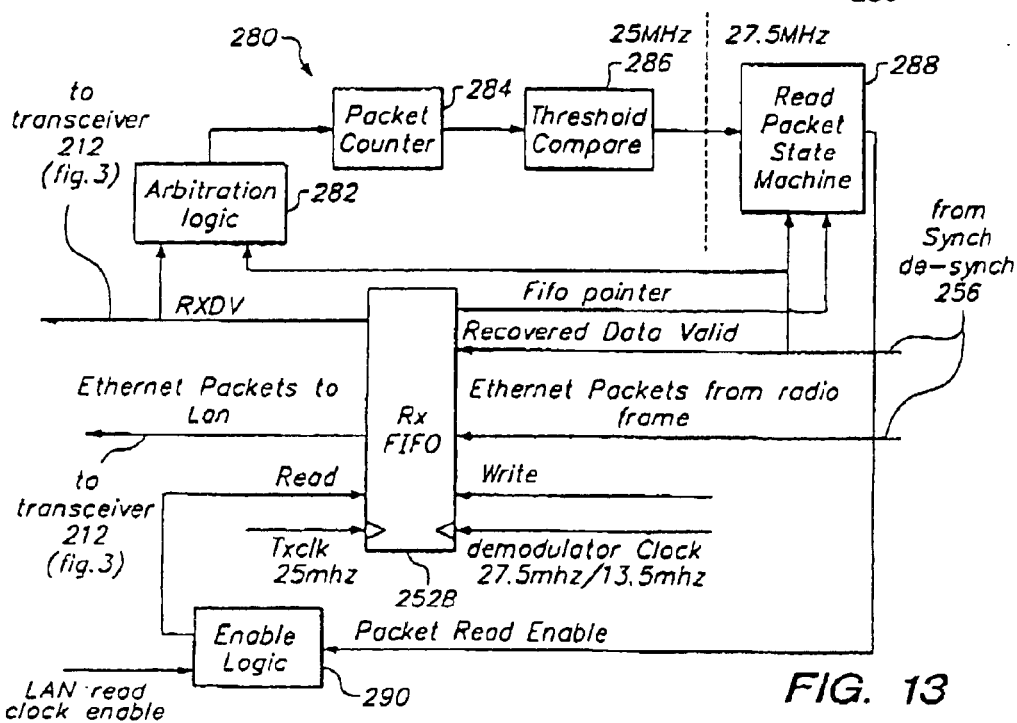
FIG. 13 illustrates a schematic block diagram of a radio frame-to-Ethernet synchronizing portion of the rate control logic according to the present invention.

FIG. 13 illustrates a schematic block diagram of a radio frame-to-Ethernet synchronizing portion 280 of the rate control logic 250 (FIG. 4) according to the present invention. The receive buffer 252B forms a portion of the rate buffers 252 (FIG. 4). 100BASE-T Fast Ethernet packets recovered from radio frames 350 (FIG. 6), and a recovered receive data valid signal RXDV, are received into the receive buffer 252B from the synch/de-synch block 256, as explained above in reference to FIG. 4. The internally generated clock to signal at 27.5 MHz is synchronous with the radio frames 350 (FIG. 6) and utilized for clocking the incoming Ethernet data packets into the receive buffer 252B. Ethernet data packets stored in the receive buffer 252B are retrieved and provided to the transceiver 212 (FIG. 3) according to a 25 MHz clock.

If no spectrum spreading is employed for data communicated via the link 102, then the clock signal utilized for clocking data into the receive buffer 252B preferably operates at 27.5 MHz. Because the clock signal utilized for retrieving data from the receive buffer 252B preferably operates at 25 MHz, there is no possibility that the receive buffer 252B will become empty while an Ethernet packet is still being received into the receive buffer 252B.

However, in the event that spectrum spreading is employed for data communicated via the link 102, however, the clock signal applied to the receive buffer 252B can operate at a lower frequency (e.g. 13.75 MHz), that is synchronous with the internally generated 27.5 MHz clock signal. In which case, it would be possible for the receive buffer 252B to become empty while an Ethernet packet is still being received into the receive buffer 252B. Thus, the synchronizing portion 280 of the rate control logic 250 avoids this potential problem, as explained below.

The recovered receive data valid signal is provided by the synch/de-synch block 256 (FIG. 4) to a first input of an arbitration logic block 282 and to a read packet state machine 288. In response to a complete Ethernet packet being stored in the receive buffer 252B, as indicated by the recovered data valid signal, the arbitration logic 282 instructs a packet counter 284 to increment a count by one. As Ethernet packets are retrieved from the receive buffer 252B, a data valid signal RXDV is also retrieved from the receive buffer 252B. This data valid signal RXDV is utilized by the transceiver 212 (FIG. 3) and applied to a second input to the arbitration logic block 282. In response to a complete Ethernet data packet being removed from the receive buffer 252B, and supplied to the transceiver 212 (FIG. 3), as indicated by the data valid signal RXDV, the arbitration logic block 282 instructs the packet counter 284 to decrement the count by one. Thus, the packet counter 284 maintains a current count of complete Ethernet data packets in the receive buffer 252B.

This count is provided by the packet counter 284 to a threshold compare block 286. The threshold compare block 286 notifies a read packet state machine 288 when a sufficient number of complete Ethernet packets are stored in the receive buffer 252B to initiate retrieval of the packets from the receive buffer 252B. In the preferred embodiment, only one complete Ethernet packet need be stored in the receive buffer 252B to initiate the read packet state machine 288 to retrieve the packet. Once initiated to retrieve a packet, the read state machine 288 activates a first input to a logic AND gate 290. A second input to the logic AND gate 290 receives a LAN read clock enable signal from the transceiver 212 (FIG. 3). This LAN read clock enable signal is activated when the transceiver 212 is ready to receive the Ethernet packet data for communication to the TFU 106 (FIG. 1).

An output of the logic AND gate 290 is coupled to a read input of the receive buffer 252B for retrieving the packet from the receive buffer 252B. As it is being retrieved, the packet is provided to the transceiver 212. Accordingly, this aspect of the present invention prevents the receive buffer 252B from being emptied while a packet is being provided from the receive buffer 252B to the transceiver 212 (FIG. 3).

A first alternate approach for avoiding overflow in the receive buffer 252B of the terminal 100 during periods when data is being communicated over the wireless link 102 according to maximum transmission rates can be implemented when an Ethernet data source (e.g. a terminal in the LAN 128') is operating at a slightly higher rate than the reference clock utilized for removing data from the receive buffer 252B. This approach includes monitoring the current depth of the receive buffer 252B, and as the amount of occupied storage space increases, then the transmission rate of the Ethernet data source is adjusted upward utilizing a voltage controlled oscillator. As the amount of occupied storage space decreases, then the transmission rate of the transceiver 212 is adjusted downward. When the buffer is nearly empty, the transmission rate is set to the nominal level of 25 Mhz. Both the originating and local frequency references must be within 100 parts per million high or low of the IEEE 802.3 Ethernet specified 25 MHz.

A second alternate approach for avoiding overflow in the receive buffer 252B of the terminal 100 during periods when data is being communicated over the wireless link 102 according to maximum transmission rates, involves reducing the minimum inter-packet gap utilized for forwarding packets removed from the receive buffer 252B. For example, rather than utilizing 12 byte-times to represent the inter-packet gap, the inter-packet can be represented by 11 byte-times. This may result in a violation of the IEEE 802.3 standard for the minimum inter-packet gap, however, this result is expected to be more desirable than the loss of packet data should the receive buffer 252B overflow.

A third alternate approach for avoiding overflow in the receive buffer 252B of the terminal 100 during periods when data is being communicated over the wireless link 102 according to maximum transmission rates, is for the microprocessor 230 of the terminal 100 to send a link control command to the terminal 100'. This link control command provides a pause packet to the layer-two switch 600' (the layer-two switch 600' and associated packet buffers 602' are not shown, however, because the terminal 100' is identical to the terminal 100, it will be understood that the layer-two switch 600 and packet buffers 602 illustrated in FIG. 16 have identical counter-parts in the terminal 100', referred to herein as 600' and 602'). The pause packet causes the switch 600' to temporarily store packets in its associated packet buffers 602' rather than sending such packets to the receive buffer 252B.

Figure 14:
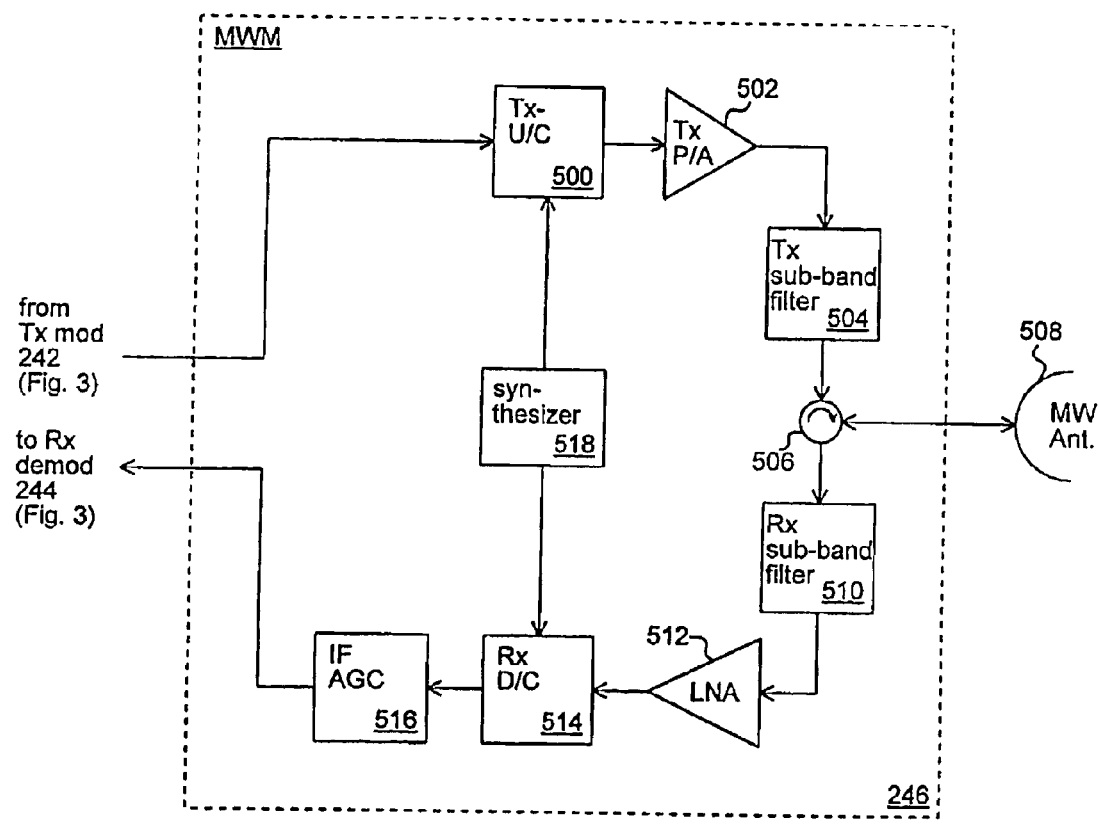
FIG. 14 illustrates a schematic block diagram of a microwave module and microwave antenna according to the present invention.

FIG. 14 illustrates a schematic block diagram of the microwave module (MWM) 246 (FIG. 3) and microwave antenna 508 according to the present invention. The MWM module 246 constitutes a wireless transceiver for implementing wireless communication over the link 102 (FIG. 1). The MWM 246 includes a transmit up-converter (TX-U/C) 500 coupled to receive signals from the transmit modulator 242. The TX U/C 500 up-converts 490 MHz IF signals received from the transmit modulator 242 to microwave frequency for transmission over the link 102. In the preferred embodiment, the frequency of transmission over the link 102 is selectable under control of the micro-processor 230 in 12.5 MHz steps across two adjacent microwave bands (e.g. 38.6–39.2 GHz and 39.3–40.0 GHz).

A transmit power amplifier (TX-P/A) 502 coupled to the transmit up-converter 500 amplifies the microwave signals provided by the transmit up-converter 500 to an appropriate level. In the preferred embodiment, the transmit power amplifier 502 has a 1-dB compression point at about 17 dBm. The nominal power is preferably set to 11 dBm, however, the transmit power is selectively controllable by the micro-processor 230 in response to detected rain fade, detected interference or in response to a link control command.

A transmit sub-band filter 504 coupled to the output of the transmit power amplifier 502 filters unwanted frequencies from the microwave signal to be transmitted over the link 102. The microwave module 246 includes a di-plexer 506 coupled to the transmit sub-band filter 504. The di-plexer 506 couples the microwave module 246 to the microwave antenna 508 for full-duplex communication over the link 102 by the microwave module 246. The antenna 508 transmits microwave signals over the link 102 and receives microwave signals from the link 102.

A microwave signal received from the link 102 by the antenna 508 is provided to a receive sub-band filter 510 via the di-plexer 506. The receive sub-band filter 510 filters unwanted frequencies from the received signal and provides a filtered signal to a low noise amplifier (LNA) 512. Then, the received signal is down-converted, preferably to 150 MHz IF by a receive down-converter (RX D/C) 514. It will be apparent, however, that a frequency other than 150 MHz can be selected. An intermediate frequency automatic gain control (IF AGC) circuit 516 adjusts the level of the down-converted signal to a predetermined level. An output formed by the IF AGC 516 circuit 514 is provided to the receive demodulator 244.

According to the preferred embodiment of the present invention, a microwave frequency synthesizer 518 included in the microwave module 246 is locked to a precision crystal reference signal and is digitally controlled by the microprocessor 230 (FIG. 3) with a 12.5 Mhz step capability. Two outputs of the frequency synthesizer 516 are each locked to the same crystal reference signal and provided to the transmit up-converter 500 and to the receive down-converter 514 for performing up-conversion and down-conversion, respectively.

Figure 15:
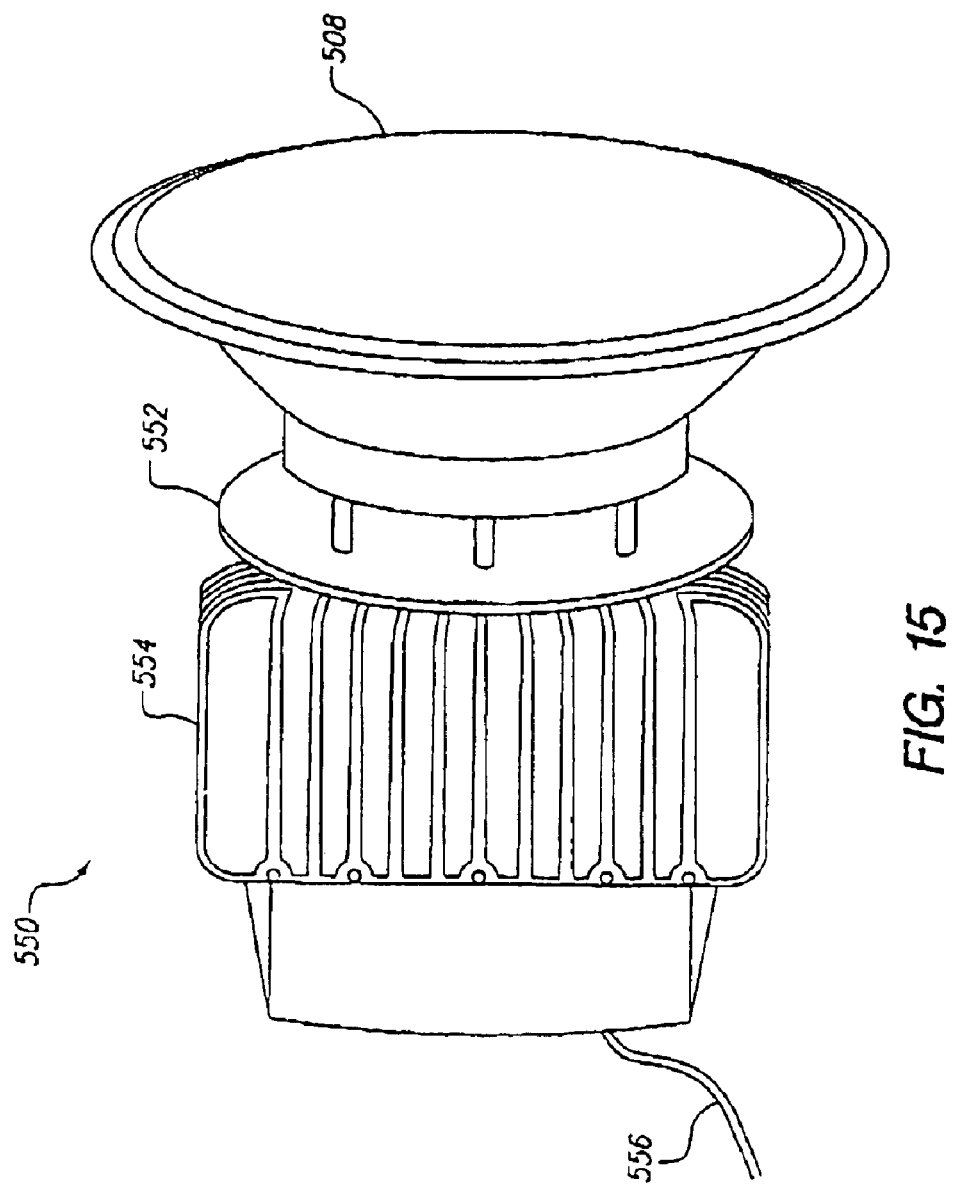
FIG. 15 illustrates a perspective view of the microwave antenna and a housing for the outdoor unit according to the present invention.

FIG. 15 illustrates a perspective view of the microwave antenna 508 and a housing 550 for the outdoor unit 104 (FIGS. 1 and 3) according to the present invention. The housing 550 protects the ODU 104 from environmental conditions, such a rain, snow and sunlight, which can be encountered on roof-tops where the ODU 104 is typically positioned. The housing 550 includes a flange 552 for attaching the antenna 508 and cooling fins 554 for dissipating heat generated by the electrical circuits of the ODU 104. A cable 556 which is preferably weather-resistant and electrically shielded, extends between, and electrically connects, the ODU 104 to the TFU 106 (FIGS. 1 and 3). Thus, the cable 556 includes each of the cables 108, 110, 112 and 114 (FIGS. 1 and 3).

Figure 16:
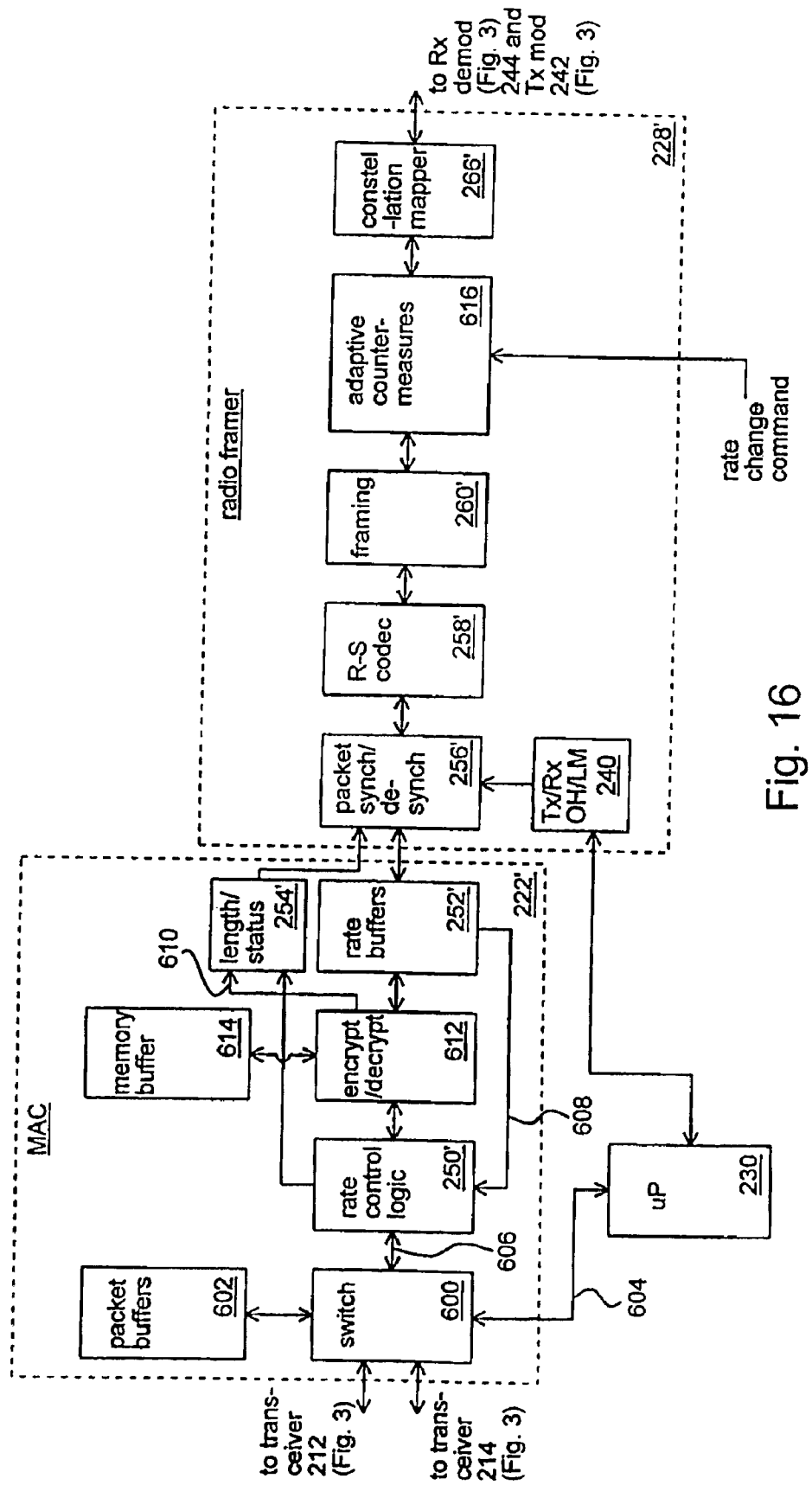
FIG. 16 illustrates a schematic block diagram of an alternate embodiment of the digital signal processing MAC and radio framer according to the present invention.

FIG. 16 illustrates a schematic block diagram of an alternate embodiment of the digital signal processing MAC 222' and radio framer 228' according to the present invention. Elements illustrated in FIG. 16 having a one-to-one functional correspondence with elements illustrated in FIG. 4 are given the same reference numeral, but are distinguished by the reference numeral being primed. In one respect, the arrangement illustrated in FIG. 16 differs from that illustrated in FIG. 4 in that a layer-two switch 600 and associated packet buffer 602 are added.

According to the embodiment of the MAC 222' illustrated in FIG. 16, the Ethernet switch 600 is coupled to the transceivers 212, 214 (FIG. 3) and to packet buffers 602. The packet buffers 602 provide a temporary storage for packets while being directed through the switch 600. The switch 600 is also coupled to the microprocessor 230 via an interface 604 and to the rate control logic 250' via an interface 606. The switch 600 can be a conventional layer-two Ethernet network switch having a 100BASE-T port coupled to the cable 108 and a 10BASE-T port coupled to the cable 110. In the preferred embodiment, the switch 600 also includes a 10BASE-T port which is coupled to the microprocessor 230 via the interface 604 and a 100BASE-T MII port which is coupled to the rate control logic 250' via the interface 606.

Network management and link control traffic in the form of Ethernet packets received by the switch 600 from the transceiver 212, the transceiver 214, or the interface 606, and which include the MAC address of the microprocessor 230 as a destination address are directed to the microprocessor 230 via the interface 604 by the switch 600. Similarly, the microprocessor 230 sends Ethernet packets to the rate control logic 250' via the switch 600 for communication over the link 102 and to the transceivers 212, 214 via the switch 600 for communication with the router or switch 116 (FIG. 1).

In the preferred embodiment, the switch 600 implements a flow control technique in accordance with IEEE 802.3x. According to the present invention, the flow control technique is selectively initiated by the rate control logic 250' sending a pause packet to the switch 600 via the interface 606. Each pause packet includes an indication of a how long the flow control technique is to remain active. In response to receiving the pause packet, the switch 600 does not provide packets which are received from the transceivers 212, 214 or from the interface 604 to the interface 606. Rather, when the flow control technique is active, the switch 600 temporarily queues such packets by storing them in the packet buffers 602. The pause signal can preferably be initiated for several hundred milli-seconds while packets are received from the transceivers 212, 214 or from the interface 604 without loss of any such packets. When the indicated time expires, the flow control technique is deactivated. Upon deactivation of the flow control technique, the switch 600 retrieves the queued packets from the packet buffers 602 and provides them to the rate control logic 250' via the interface 606.

The rate control logic 250' sends a pause packet with an indicated activation period in response to a halt control signal received from the rate buffers 252' via a signal line 608. When activated, the halt signal provided via the signal line 608 indicates that the rate buffers 252' are nearly full. The indicated activation period included in the pause packet is appropriate to allow sufficient data to be removed from the rate buffers 252' and communicated over the link 102 via radio frames 350.

As an example of operation of the MAC 222', assume that rain fade or interference is detected in the link 102 by an increase in a measured bit error rate (BER). In response, a link control command is issued by the microprocessor 230 which causes the data rate for the link 102 to be reduced. As a result of this lower data rate for the link 102, radio frames 350 are formed less quickly and, thus, data is removed from the rate buffers 252' at a lower rate. If the reduced data rate results in the rate buffers 252' becoming nearly full, the rate buffers 252' activate the halt signal via the signal line 608. In response, the rate control logic 250' sends a pause packet to the switch 600. Then, while flow control is active, packets received from the transceiver 212, 214 or the interface 604 for communication over the link 102 are temporarily queued in the packet buffers 602. Accordingly, the MAC 222' according to the present invention implements a flow control technique for adapting a current rate of data transmission over the link 102 to a rate at which Ethernet packets are received by the MAC 222' from the TFU 106 (FIGS. 1 and 3), without loss of the Ethernet packets.

In addition, the embodiment of the MAC 222' illustrated in FIG. 16 includes an encryption/decryption block 612 coupled between the rate control logic 250' and the rate buffers 252'. Accordingly, for packets to be transmitted over the link 102, the encryption/decryption block 612 encrypts the Ethernet data packets prior to temporarily storing the data packet in the rate buffers 252'. Conversely, Ethernet packets received from the link 102 are decrypted by the encryption/decryption block 612 before being provided to the switch 600. A memory buffer 614 coupled to the encryption/decryption block 612 provides a temporary memory store for use during encryption/decryption of the Ethernet packets. An encryption start control signal line 610 coupled between the encryption/decryption block 612 and the length/status buffer 254' is utilized by the encryption/decryption block 612 to instruct the length/status buffer 254' to provide an encryption tag and sequence number to the packet synch/de-synch block 256'. This arrangement which includes the encryption/decryption block 612 provides an advantage over the arrangement illustrated in FIG. 4 in that data security is enhanced.

Figure 17:
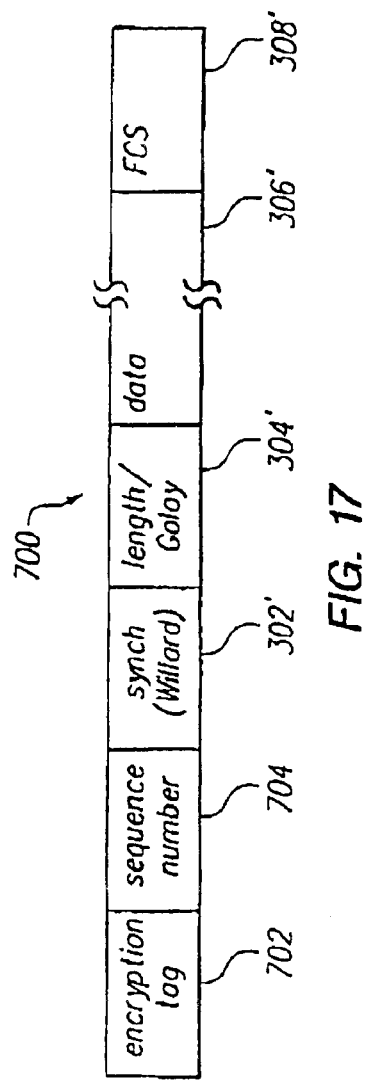
FIG. 17 illustrates a frame structure for reformed 100BASE-T Ethernet data packets formed by the MAC and radio framer illustrated in FIG. 14.

FIG. 17 illustrates a frame structure 700 for reformed 100BASE-T Ethernet data packets formed by the MAC 222' and radio framer 228' illustrated in FIG. 16. When the packet is removed from the rate buffers 252' and reformed for insertion to a radio frame 350 (FIG. 6), the encryption tag and sequence number provided by the length/status buffer 254' (FIG. 16) are appended to the reformed packet frame 700 in an encryption tag field 702 and a sequence number field 704, respectively. The encryption tag indicates an appropriate key box utilized to encrypt the data while the sequence number provides synchronization information to the terminal which receives the reformed Ethernet data frame 700 from the wireless link 102. Fields of the reformed packet frame 700 illustrated in FIG. 17 which have one-to-one functional correspondence with those illustrated in FIG. 5 are given the same reference numeral primed.

Referring to FIG. 16, this arrangement also differs from that illustrated in FIG. 4 in that the PN randomizer/de-randomizer 262 and the differential encoder/decoder 264 are omitted and, instead, an adaptive countermeasures block 616 takes their place. The adaptive countermeasures block 616 responds to a rate change command issued by the microprocessor 230 by changing the rate at which data is communicated over the wireless link 102. The rate at which data is communicated can be in response to a detected increase in BER due to rain fade or can be to reduce interference with nearby wireless links, such as to reduce interference between subscriber terminals in a point-to-multipoint network.

Figure 18:
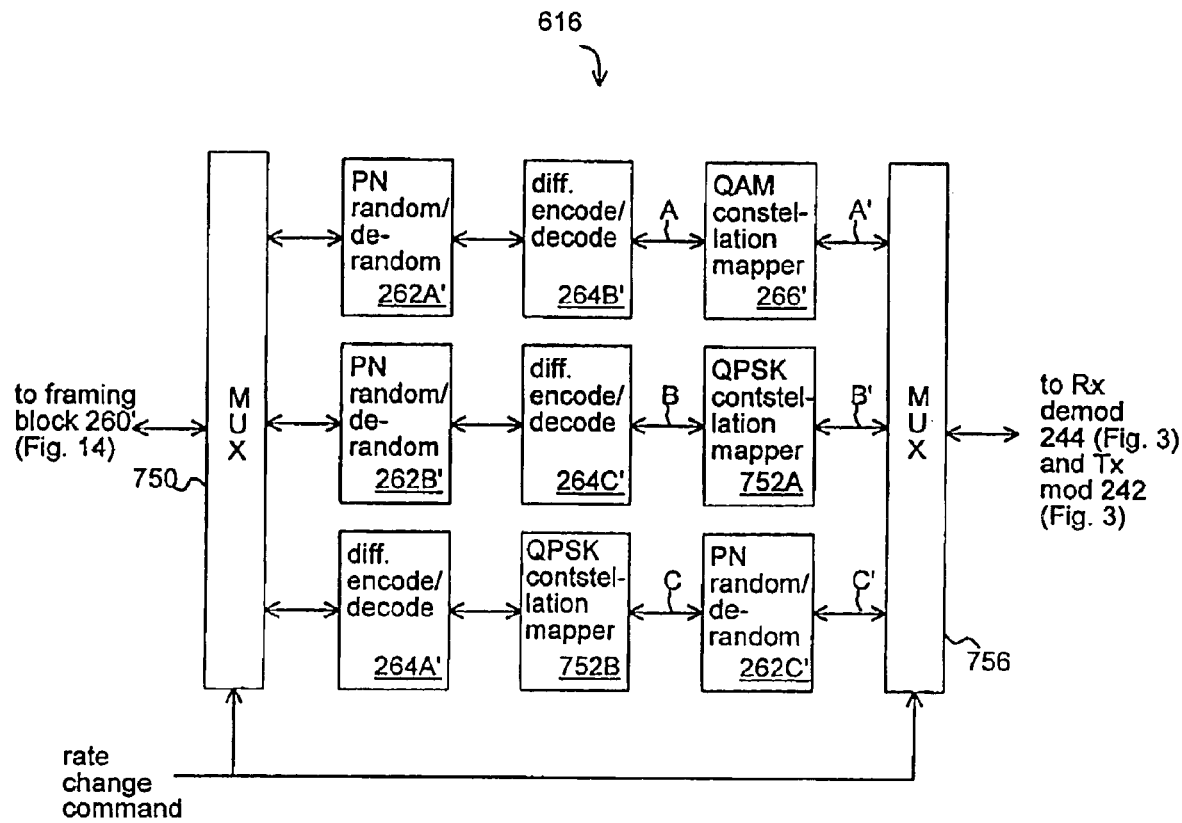
FIG. 18 illustrates a schematic block diagram of an adaptive countermeasures block according to the present invention.

FIG. 18 illustrates a schematic block diagram of the adaptive countermeasures block 616 according to the present invention. A multiplexer 750 is coupled to the framing block 260' (FIG. 16) for communicating radio super frames 380 (FIG. 7) with the framing block 260'. A first PN randomizer/de-randomizer 262A', a second PN randomizer/de-randomizer 262B' and a first differential encoder/decoder 264A' are each coupled to receive selected radio super frames 380 from the multiplexer 750 depending upon conditioning of the multiplexer 750 by the rate change control signal.

In the preferred embodiment, the PN randomizer/de-randomizers 262A', 262B, 262C' perform scrambling on the radio super frames 380 in an identical manner to the PN randomizer/de-randomizer 262 illustrated in FIGS. 4 and 8. Super frames 380 scrambled by the PN randomizer/de-randomizer 262A' are provided to a second differential encoder/decoder 264B'. The differential encoder/decoders 264A', 264B' and 264C' preferably perform encoding and decoding in an identical manner to the differential encoder/de-coder 264 illustrated in FIG. 4. Then, super frames 380 encoded by the second encoder/decoder 264B' are provided to a QAM constellation mapper 266'. The QAM constellation mapper 266' preferably performs QAM constellation mapping in an identical manner to the QAM constellation mapper 266 illustrated in FIGS. 4 and 16. A multiplexer 756 is coupled to the QAM constellation mapper 266' for communicating encoded radio super frames 380 with the Rx demodulator 244 (FIG. 3) and Tx modulator 242 (FIG. 3). Thus, when a first path through the PN randomizer/de-randomizer 262A', the second differential encoder/decoder 264B' and QAM constellation mapper 266' is selected, radio super frames 380 are conditioned identically for transmission and reception as when passing through the PN randomizer/de-randomizer 262, differential encoder/decoder 264 and QAM constellation mapper illustrated in FIG. 4. In the preferred embodiment, the first path conditions the radio super frames 380 according to 16 QAM.

The third differential encoder/decoder 264C' is coupled to the PN randomizer/de-randomizer 262B' and to a quadrature phase-shift (QPSK) constellation mapper 752A. The QPSK constellation mapper 752A maps portions of the radio frame 350 to QPSK symbols according to quadrature phase-shift keying techniques (QPSK). Super frames 380 are communicated between the QPSK constellation mapper 752A and the multiplexer 756. Thus, when a second path through the PN randomizer/de-randomizer 262B', the differential encoder/decoder 264C' and QPSK constellation mapper 752A is selected, radio super frames 380 are conditioned for transmission and reception according to QPSK format.

A second QPSK constellation mapper 752B is coupled to the differential encoder/decoder 264A' and to a PN randomizer/de-randomizer 262C'. The QPSK constellation mapper 752B maps portions of the radio frame 350 to QPSK symbols according to quadrature phase-shift keying techniques (QPSK) identically to the QPSK constellation mapper 752A. Super frames 380 are communicated between the QPSK constellation mapper 752B and the multiplexer 756. Thus, when a third path through the differential encoder/decoder 264A', QPSK constellation mapper 752B and PN randomizer/de-randomizer 262C', is selected, radio super frames 380 are conditioned for transmission and reception according to QPSK format with spectrum spreading. Upon reception, super frames 380 routed through this third path are appropriately de-spreaded and decoded for communication with the framing block 260'.

So that the radio super frames 380 are properly received by a receiving terminal (e.g. the terminal 100 illustrated in FIG. 1), it is important the appropriate path is selected through the adaptive countermeasures block 616 for each radio super frame 380. This can be accomplished by the transmitting terminal 100 notifying the receiving terminal 100' of the manner and rate at which the transmitting terminal 100 is transmitting radio super frames 380.

Figure 19:
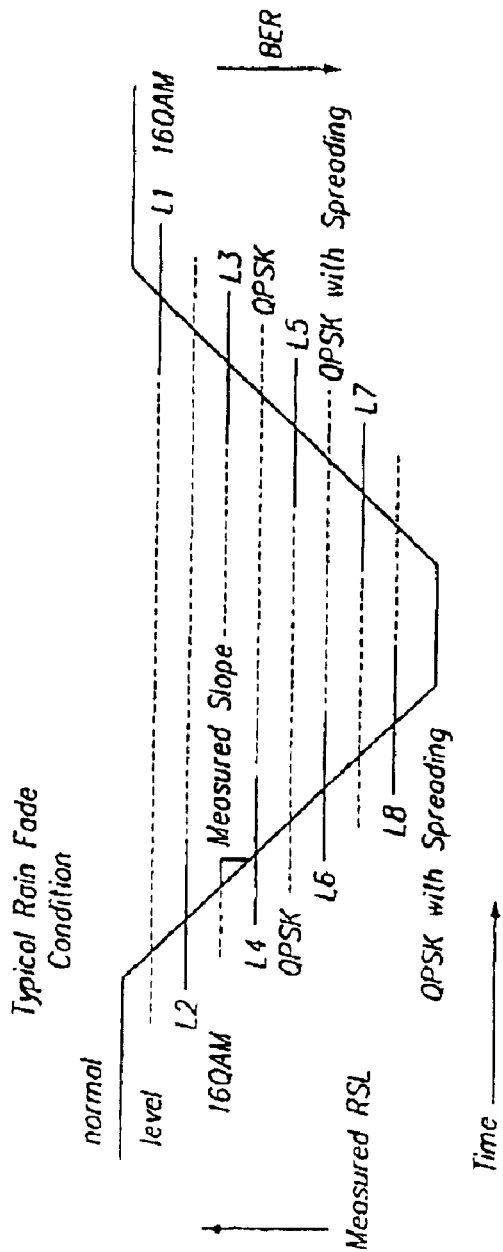
FIG. 19 illustrates a chart of received signal level vs. time as a result of rain fade.
Figure 20:
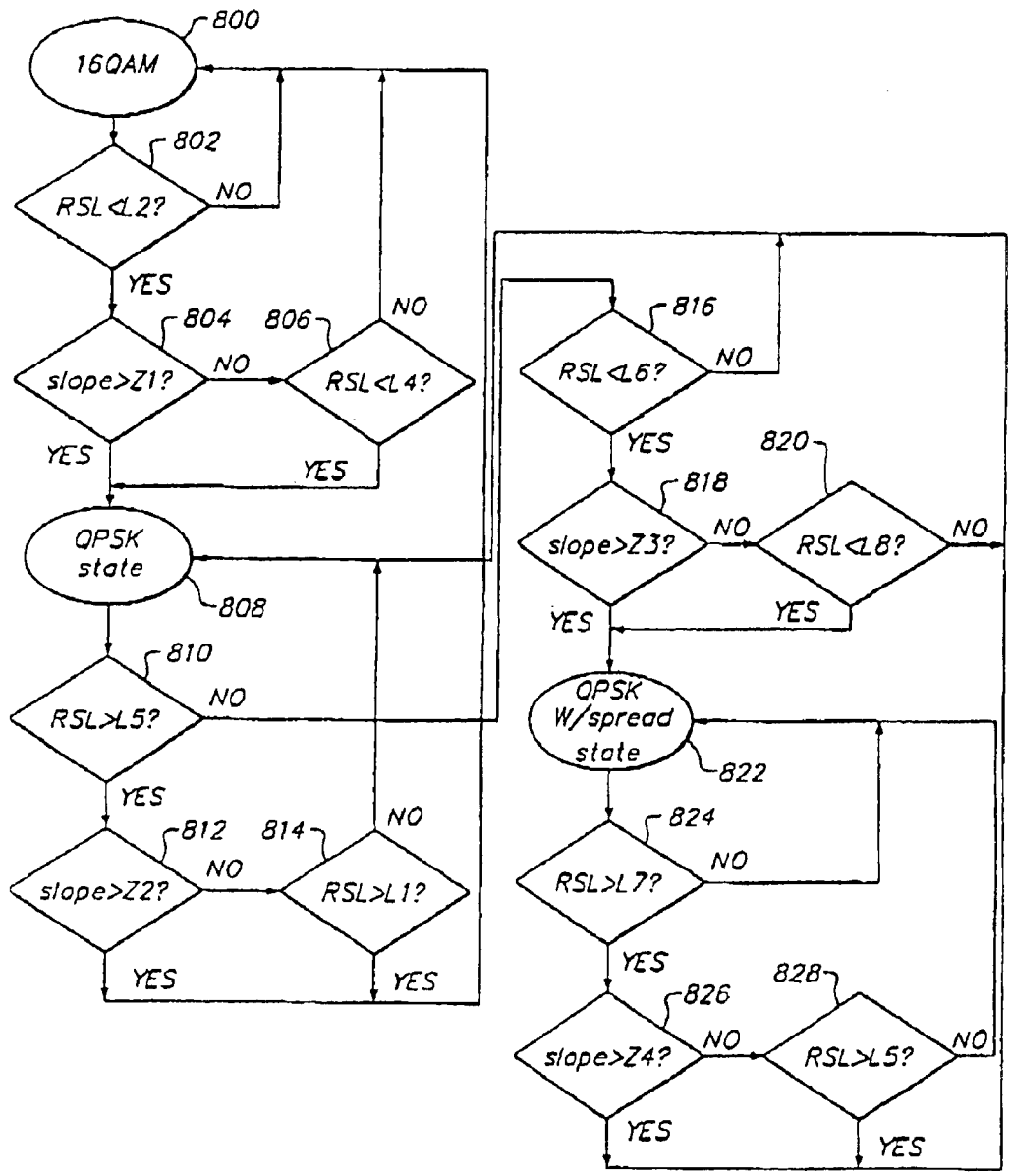
FIG. 20 illustrates a flow diagram for implementing counter-measures according to the present invention.

FIG. 19 illustrates a chart of received signal level vs. time as a result of rain fade. Refer to FIGS. 1 and 20 and assume that the terminal 100 is receiving data from the terminal 100' via the wireless link 102. When rain occurs between the terminals 100 and 100', the level of the microwave carrier signal received by the terminal 100, the received signal level (RSL) falls over time as the rain increases over time. Thus, depending upon the weather conditions, the RSL can eventually fall from a normal level to below threshold levels set at L1–L8. When the RSL is above the threshold level L1, this represents an insubstantial level of rain fade. However, when the RSL is below the threshold level L8, this represents a extreme level of rain fade. The threshold levels L2–L7 represent progressively increasing levels of rain fade between the extremes represented by L1 and L8. The rate at which the RSL falls (the measured slope) can also vary depending upon the weather conditions. Similarly, as the weather conditions improve, the RSL can return the normal level. In response to rain fade, the bit error rate (BER) tends to rise. Thus, the adaptive countermeasures implemented by the present invention can detect the presence of rain fade by measuring the RSL or the BER.

In addition, the BER tends to rise in response to interference between nearby wireless links. A significant difference between rain fade and interference, however, is that in the event of interference, the RSL can remain at a normal level while the BER rises. Accordingly, the adaptive countermeasures implemented by the present invention can detect the effects of interference by measuring the BER.

Accordingly, in the preferred embodiment, the present invention responds to both the measured RSL and the measured BER. To simplify the following discussion, an example involves a response to rain fade detected by measuring the RSL. It will be apparent, however, that an identical response can be made by measuring the BER. Thus, in the following discussion, the BER, rather than the RSL, is compared to the various thresholds disclosed (in addition, the operators > and < are exchanged with each other). In addition, it will be apparent that a response can be made simultaneously to both the RSL and to the BER with appropriate modifications.

FIG. 20 illustrates a flow diagram for implementing counter-measures according to the present invention in response to measured RSL. In the preferred embodiment, the microprocessor 230 (FIG. 3) is appropriately programmed to implement the flow diagram illustrated in FIG. 20. In a first state 800, the terminal 100 is configured for communicating data at 16 QAM. Then, program flow moves from the state 800 to a state 802. In the state 802 a determination is made whether the RSL has fallen below the threshold level L1. If the RSL has not fallen below the threshold level L1, then program flow returns to the state 800.

If, however, the RSL has fallen below the threshold level L2, then program flow moves to a state 804. In the state 804, a determination is made whether the rate at which the RSL is changing exceeds a first predefined slope Z1. If the rate does not exceed the predefined slope Z1, then program flow moves from the state 804 to a state 806. In the state 806, a determination is made whether the RSL has fallen below the threshold L4. If the RSL has not fallen below the threshold L4, then program flow returns to the state 800.

If, however, the RSL has fallen below the threshold L4, then program flow moves from the state 806 to a state 808. If the determination made in the state 804 resulted in a determination that the rate did exceed the predefined slope Z1, then the program flow moves from the state 804 to a state 808. In the state 808, the terminal is configured to transmit data according to QPSK (without spectrum spreading). Then program flow moves from the state 808 to a state 810.

In the state 810, a determination is made as to whether the RSL is above the threshold L5. If the RSL is above the level L5, then program flow moves from the state 810 to a state 812. In the state 812, a determination is made as to whether the rate at which the RSL is changing exceeds a predefined slope Z2. If the rate exceeds the slope Z2, then program flow returns to the state 800. If the rate does not exceed the slope Z2, then program flow moves from the state 812 to a state 814.

In the state 814, a determination is made whether the RSL is above the threshold level L1. If not, then program flow returns to the state 808. If in the state 814, the RSL is above the threshold L1, then program flow returns to the state 800.

If, in the state 810, the RSL is not above the threshold L5, then program flow moves to a state 816. In the state 816, a determination is made whether the RSL is below the threshold L6. If the RSL is not below the threshold L6, program flow returns to the state 808. If, in the state 816, the RSL is below the threshold 816, then program flow moves from the state 816 to a state 818. In the state 816, a determination is made if the rate of change in the RSL exceeds a predefined slope Z3. If the slope Z3 is not exceeded program flow moves from the state 818 to a state 820.

In the state 820, a determination is made whether the RSL is below the threshold L8. If not, then program flow returns to the state 808. If in the state 820 the RSL is not below the threshold L8, the program flow moves to a state 822. In addition, if, in the state 818, the slope Z3 is exceeded, program flow moves to the state 822. In the state 822 the terminal 100 is configured for communicating data according to QPSK with spectrum spreading.

From the state 822, program flow moves to a state 824. In the state 824, a determination is made whether the RSL is below the threshold L7. If the RSL is not below the level L7, then program flow returns to the state 822. If, in the state 824, the RSL is above the threshold L7, then program flow moves from the state 824 to a state 826. In the state 826, a determination is made whether the rate of change in the RSL exceeds a predefined slope Z4. If so, program flow returns to the state 808. If, in the state 826, the slope Z4 is not exceeded, then program flow moves to a state 828.

In the state 828, a determination is made whether the RSL is above the threshold 828. If so, program flow returns to the state 808. If, in the state 828, the RSL is not above the threshold 828, then program flow returns to the state 822.

An important aspect of the present invention is that hysteresis is introduced in the flow diagram for changing the manner of data communication in the states 800, 808 and 822, based upon the RSL. Thus, for example, to change from 16 QAM to QPSK, the RSL must fall below L2. However, to change from QPSK to 16 QAM, the RSL must rise above L1 where L1 is higher than L2. This hysteresis reduces the frequency at which the manner of communicating data is changed and prevents oscillations from occurring between any two of the states 800, 808 and 822.

Figure 21:
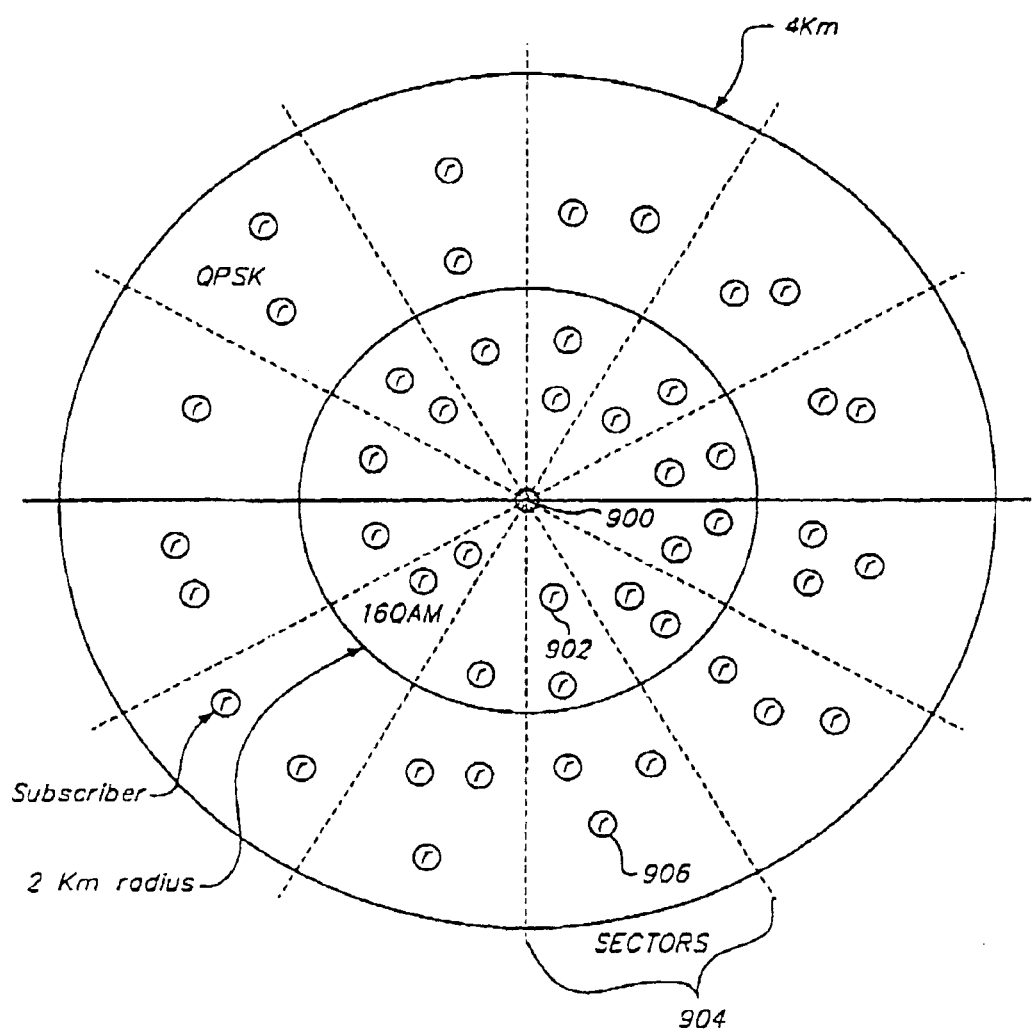
FIG. 21 illustrates a point-to-multipoint metropolitan area network divided into sectors having inner and outer radii according to the present invention.

In a point-to-multipoint MAN, a single network node communicates radio super frames 380 with a plurality of other nodes. FIG. 21 illustrates a point-to-multipoint metropolitan area network divided into sectors having inner and outer radii according to the present invention. A single node at a hub 900 communicates with a plurality of subscriber nodes, designated "r" located as various radial distances from the hub 900 and in different directions (sectors). An important advantage of the present invention that changes in manner in which data is communicated over a wireless link can be utilized to reduce interference between nodes in a same sector, but at a different radial distances from the hub 900.

As an example, assume a first subscriber node 902 is located in a sector 904 at a radial distance from the hub 900 that is less than 2 Km. Assume that a second subscriber node 906 is also located in the in the sector 904 but at a radial distance from the hub 900 that is more than 2 Km and less than 4 Km. If both subscriber nodes 902, 906 communicate with the hub 900 in the same manner, there is a probability that communications intended for the node 902 will interfere with communications intended for the node 906. In the preferred embodiment of the present invention, however, the adaptive countermeasures block 616 (FIGS. 14 and 16) of the first subscriber node 902 is conditioned to communicate data in a first manner (e.g. according to 16 QAM), whereas, the adaptive countermeasures block 616 of the second subscriber node 906 is conditioned to communicate data in a second manner (e.g. according to QPSK). The adaptive countermeasures block 616 of hub 900 is conditioned for communication with either of the nodes 902, 906, by changing back and forth between the first and second manner of communicating. This is accomplished by appropriately conditioning the rate control signal applied to the multiplexers 750, 756 (FIG. 18) of the hub 900 depending upon which node 902, 906 the hub is currently communicating with.

Figure 22:
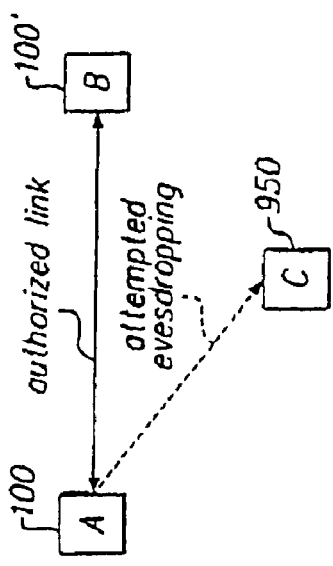
FIG. 22 illustrates a wireless link between two terminals wherein an unauthorized terminal is attempting to eavesdrop on communication between the two terminals.

In the preferred embodiment of the present invention, a security authentication protocol is implemented for data security purposes against eavesdroppers. FIG. 22 illustrates a wireless link 102 between two terminals 100 and 100' wherein an unauthorized terminal 950 is attempting to eavesdrop on communication between the two terminals 100, 100'. Each terminal 100, 100' and 950 is preconditioned to periodically authenticate the other terminal opposite the communication link. For this purpose, each terminal is assigned a unique password.

Link authentication is accomplished in the following manner: Once communication between the terminals 100 and 100' is established, the terminals 100, 100' exchange their passwords. Then, at periodic intervals, the terminal 100 sends a challenge message to the terminal 100'. The challenge message includes an identification number and a random number. The terminal 100' receives the random number and calculates a response based upon a mathematical combination of the random number and its unique password. Then the terminal 100' then sends the calculated response to the terminal 100 along with the same identification number it received.

The terminal 100 then matches the identification number it receives from the terminal 100' to the challenge message it previously sent and then compares the response it received to an expected response. The terminal 100' determines the expected response based upon its knowledge of the unique password associated with the terminal 100' and upon its knowledge of the random number included in the challenge. If the received response matches the expected response, the terminal 100' sends a success message to the terminal 100'. Data communication then resumes. Each terminal 100, 100' periodically authenticates the other in a symmetrical manner.

If, however, the received response does not match the expected response, an alarm is set in the terminal 100. In response to the alarm, the terminal 100 maintains the wireless communication link 102 by sending and receiving radio frames 350 (FIG. 6) with the terminal 100, however, the radio frames 350 sent by the terminal 100 no longer carry 100BASE-T Ethernet data. Instead, the inter-packet gap code is sent. In addition, the terminal 100 is configured to no longer detect and separate 100BASE-T Ethernet packets from received radio frames. Thus, the 100BASE-T traffic in both directions is disabled. The terminals continue attempting to re-authenticate the link, and if successful, communication of 100BASE-T packets resumes.

It is important to note that each terminal 100, 100', 950, is configured to successfully receive radio frames at all times, but us configured to successfully receive 100BASE-T packet data only if it receives a response to a challenge message which matches an expected response. The determination of whether a response to a challenge message is appropriate depends upon knowledge of the random number included in the challenge message.

Assume that once the link 102 is established, the terminal 950 attempts to eavesdrop. This is an unauthorized intruder who is attempting to receive data from the link. It is expected in such a situation, that the terminal 950 will have its transmitter muted in an attempt to escape detection. Because the transmitter of the terminal 950 is muted, it cannot authenticate with either terminal 100, 100'. Thus, although the terminal can receive responses to challenge messages sent by the terminals 100, 100', it cannot match such a response to an expected response because the terminal 950 will not have knowledge of the random number sent with the response. Thus, an alarm will be set in the terminal 950. Once this occurs, the terminal 950 can no longer receive 100BASE-T packet data. Accordingly, the attempted eavesdropping is prevented and data security maintained.

Figure 23:
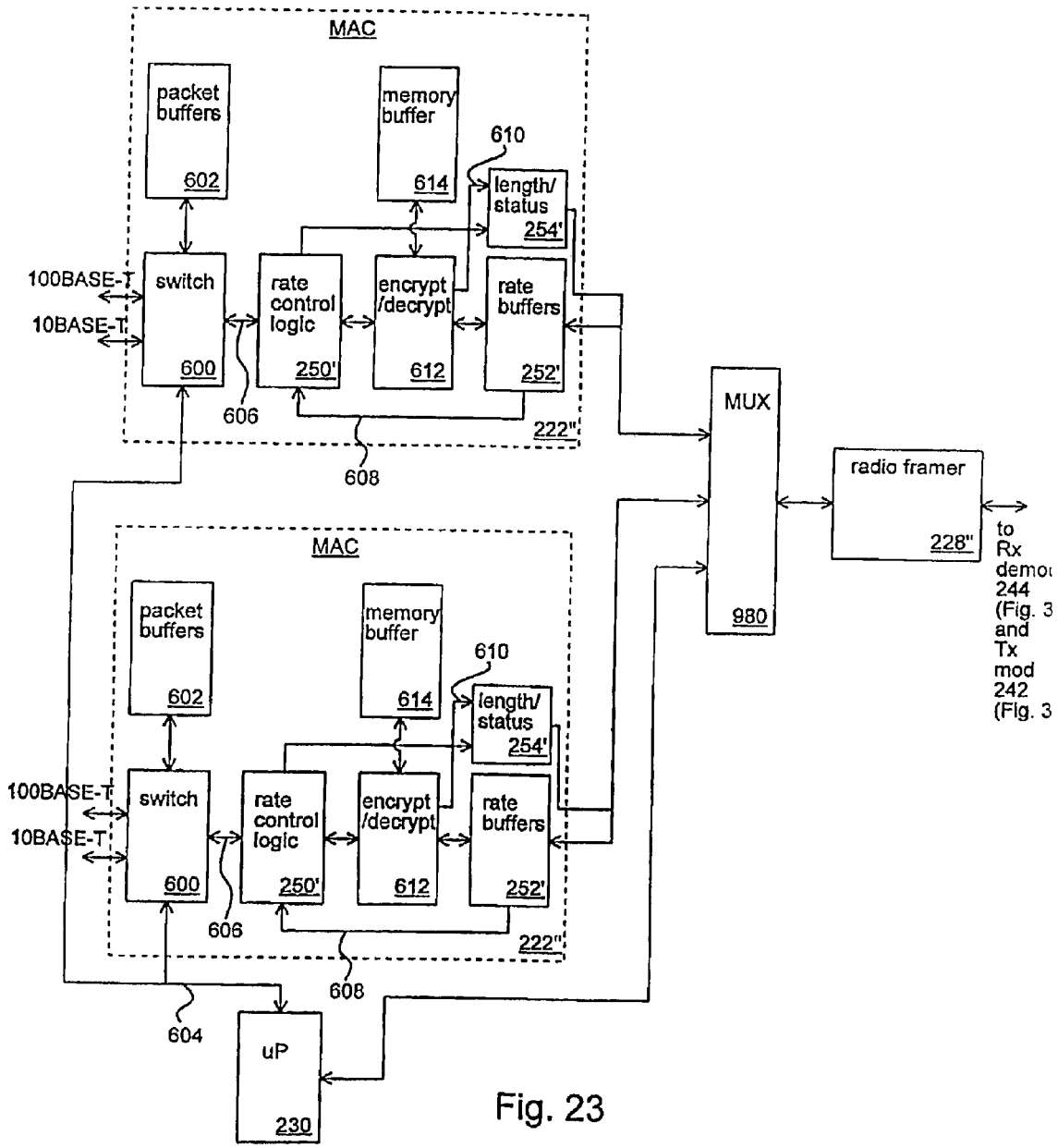
FIG. 23 illustrates an embodiment according to the present invention having multiple digital processing MACs multiplexed to a single radio framer.

FIG. 23 illustrates an embodiment according to the present invention having multiple digital processing MACs 222A", 222B" multiplexed to a single radio framer 228". The MACs 222A", 222B" can each be identical to the MAC 222' illustrated in FIG. 16 while the radio framer 228" can be identical to the radio framer 228' illustrated in FIG. 16. This embodiment enables multiple 100BASE-T Ethernet packets to be received simultaneously, one for each MAC 222A", 222B". The Ethernet packets are temporarily stored in each MAC 222A", 222" and then provided to the radio framer 228" via a multiplexer 980 according to time division multiplexing. The time division multiplexed data is then communicated over the wireless link 102. According to this embodiment, the wireless link 102 is configured to communicate data at 200 Mbps. It will be apparent that a number, n, of MACs can be coupled to the multiplexer 980 thereby achieving a n×100 Mbps data rate for the wireless link 102. Such an arrangement is limited by the maximum bandwidth capacity for the wireless link 102.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A terminal for transporting data packets via radio frames, the terminal comprising:
   a. a data packet receiver for receiving data packets for communication over a wireless link wherein not every data packet has a same length;
   b. a data packet formatting apparatus coupled to the data packet receiver, the data packet formatting apparatus for formatting the data packets according to radio frames wherein the radio frames each have a same length and wherein the data packets are formatted into the radio frames such that boundaries for the data packets are not necessarily aligned with boundaries for the radio frames; and
   c. a wireless transceiver coupled to the packet formatting apparatus, the wireless transceiver for communicating the radio frames over the wireless link.

2. The terminal according to claim 1 wherein the terminal does not convert the data packets into a telephony communication protocol or into an asynchronous transfer mode (ATM) protocol prior to communication of the radio frames over the wireless link.

3. The terminal according to claim 1 further comprising a data packet synchronizer coupled to the data packet receiver and to the data packet formatting apparatus for synchronizing the data packets to a clock signal associated with the radio frames.

4. The terminal according to claim 1 wherein the data packets are Fast Ethernet data packets.

5. The terminal according to claim 1 wherein the data packets are time-division multiplexed into the radio frames.

6. The terminal according to claim 1 wherein each radio frame includes a data field having a predetermined length for receiving the data packets.

7. The terminal according to claim 6 wherein the data packets are received by the data packet receiver separated by an inter-packet gap and wherein a code representative of the inter-packet gap is stored in the data field between the data packets.

8. The terminal according to claim 1 wherein the data packet receiver receives the data packets from a local area network coupled to the data packet receiver via a twisted pair of wires.

9. The terminal according to claim 8 wherein the data packets are Fast Ethernet data packets.

10. The terminal according to claim 9 wherein the data packet receiver is an Ethernet switch.

11. The terminal according to claim 10 wherein the Ethernet switch comprises a 100BASE-T port for receiving the data packets from the local area network.

12. The terminal according to claim 11 wherein the Ethernet switch further comprises an MII (media independent interface) for providing the data packets to the packet formatting apparatus.

13. The terminal according to claim 1 wherein the data packet receiver receives the data packets from a local area network coupled to the data packet receiver via a fiber optic cable.

14. The terminal according to claim 1 wherein the radio frames are communicated over the wireless link according to full-duplex communication.

15. A method of transporting data packets via radio frames wherein the method comprises steps of:
   a. receiving data packets wherein not every data packet has a same length;
   b. formatting the data packets according to radio frames wherein the radio frames each have a same length and wherein the data packets are formatted into the radio frames such that boundaries for the data packets are not necessarily aligned with boundaries for the radio frames; and
   c. communicating the radio frames over the wireless link.

16. The method according to claim 15 wherein each radio frame includes a data field having a predetermined length and wherein the step of formatting includes a step of placing the data packets into the data field.

17. The method according to claim 16 wherein the step of receiving data packets comprises a step of receiving an inter-packet gap between each packet.

18. The method according to claim 17 wherein the step of formatting the data packets comprises a step of inserting a code representative of an inter-packet gap into radio frames between each data packet.

19. The method according to claim 16 further comprising a step of synchronizing the data packets to a clock signal associated with the radio frames.

20. The method according to claim 15 wherein the step of receiving the data packets comprises a step of receiving the data packets from a local area network via a twisted pair of wires.

21. The method according to claim 20 wherein the data packets are Fast Ethernet data packets.

22. The method according to claim 21 wherein the method does not include a step of converting the data packets into a telephony communication protocol or into an asynchronous transfer mode (ATM) protocol prior to communication of the radio frames over the wireless link.

23. The method according to claim 15 further comprising a step of mapping portions of the radio frame to quadrature amplitude modulation symbols.

24. The method according to claim 15 wherein the step of formatting the data packets according to radio frames includes a step of time-division multiplexing the data packets into the radio frames.

25. The method according to claim 15 further comprising steps of:
 a. receiving the radio frames from the wireless link; and
 b. reconstructing the data packets from received radio frames.

26. A method of transporting data packets via radio frames wherein the method comprises steps of:
 a. receiving data packets wherein not every data packet has a same length and wherein each data packet is separated by an inter-packet gap;
 b. formatting the data packets according to radio frames wherein each radio frame includes a data field having a predetermined length and wherein the data packets are formatted into each data filed one after the other wherein each data packet is separated from its neighbors by a code representative of an inter-packet gap and wherein boundaries fro the data packets are not necessarily aligned with boundaries for the radio frames such that the data packets are time-division multiplexed into the radio frames; and
 c. communicating the radio frames over the wireless link.

27. The method according to claim 26 wherein the data packets are Fast Ethernet packets.

28. The method according to claim 27 wherein the method does not include a step of converting the data packets into a telephony communication protocol or into an asynchronous transfer mode (ATM) protocol prior to communication of the radio frames over the wireless link.

29. The method according to claim 27 wherein the code representative of an inter-packet gap is representative of an inter-packet gap of approximately of 0.96 µs.

30. The method according to claim 26 further comprising a step of synchronizing the data packets to a clock signal associated with the radio frames.

31. A method of transporting Fast Ethernet data packets via radio frames over a wireless link, the method comprising steps of
 a. receiving Fast Ethernet data packets into a receiver from a first local area network via a twisted pair of wires;
 b. formatting the data packets according to radio frames wherein the radio frames each have a same length and wherein the Fast Ethernet data packets are formatted into radio frames such that boundaries for the Fast Ethernet packets are not necessarily aligned with boundaries for the radio frames;
 c. communicating the radio frames over the wireless link;
 d. receiving the radio frames from the wireless link;
 e. reconstructing the Fast Ethernet data packets from received radio frames; and
 f. communicating reconstructed Fast Ethernet data packets to a second local area network.

32. The method according to claim 31 wherein each radio frame includes a data field having a predetermined length and wherein the step of formatting includes a step of placing the data packets into the data field.

33. The method according to claim 31 wherein the step of formatting the data packets according to radio frames includes a step of time-division multiplexing the data packets into the radio frames.

34. The method according to claim 31 further comprising a step of synchronizing the data packets to a clock signal associated with the radio frames.

35. The method according to claim 31 wherein the method does not include a step of converting the data packets into a telephony communication protocol or into an asynchronous transfer mode (ATM) protocol prior to communication of the radio frames over the wireless link.

36. A terminal for transporting data packets via radio frames, the terminal comprising:
 a. a data packet receiver for receiving data packets for communication over a wireless link wherein not every data packet has a same length;
 b. a packet formatting apparatus coupled to the data packet receiver, the packet formatting apparatus for formatting the data packets according to radio frames wherein the packet formatting apparatus comprises:
 c. means for performing forward error correction on data from the data packets thereby forming error corrected data;
 d. means for inserting the error corrected data into radio frames; and
 e. means for randomizing data within the radio frames; and
 f. a wireless transceiver coupled to the packet formatting apparatus, the wireless transceiver for communicating the radio frames over the wireless link.

37. The terminal according to claim 36 wherein the data packets are Fast Ethernet data packets.

38. The terminal according to claim 37 wherein the radio frames each have a same length and wherein the packet formatting apparatus formats the data packets into the radio frames such that boundaries for the data packets are not necessarily aligned with boundaries for the radio frames.

39. The terminal according to claim 38 further comprising a data packet synchronizer coupled to the data packet receiver and to the data packet formatting apparatus for synchronizing the data packets to a clock signal associated with the radio frames.

40. The terminal according to claim 37 wherein the terminal does not convert the Ethernet data packets into a telephony communication protocol or into an asynchronous transfer mode (ATM) protocol prior to communication of the radio frames over the wireless link.

41. The terminal according to claim 37 wherein the data packets are time division multiplexed into the radio frames.

42. The terminal according to claim 37 further comprising a data packet synchronizer coupled to the data packet receiver and to the data packet formatting apparatus for synchronizing the data packets to a clock signal associated with the radio frames.

43. The terminal according to claim 37 wherein the packet formatting apparatus further comprises means for mapping portions of the radio frame to quadrature amplitude modulation symbols.

44. The terminal according to claim 37 wherein the radio frames are communicated over the wireless link according to full-duplex communication.

45. A method of transporting Ethernet data packets via radio frames, the method comprising steps of:
  a. receiving Ethernet data packets wherein each data packet includes a preamble and a start-of-frame delimiter;
  b. stripping off the preamble and start-of-frame delimiter;
  c. formatting the packet data according to radio frames wherein the step of formatting includes steps of:
    i. appending a synch field to the packet data; and
    ii. appending a length field to the packet data.

46. The method according to claim 45 further comprising a step of inserting a synch value which is in accordance with a Willard code into the synch field.

47. The method according to claim 45 further comprising a step of inserting a length value and an error correcting code for correcting errors in the length value into the length field.

48. The method according to claim 47 wherein the error correcting code is a Golay error correcting code.

49. The method according to claim 45 wherein the radio frames each have a same length and wherein the step of formatting the data packets according to radio frames is performed such that boundaries for the data packets are not necessarily aligned with boundaries for the radio frames.

50. The method according to claim 45 further comprising a step of synchronizing the data packets to a clock signal associated with the radio frames.

51. The method according to claim 50 wherein the step of synchronizing comprises steps of:
  a. storing each portion of packet data in successive locations of a buffer; and
  b. removing the packet data from the packet buffer prior to performing the step of formatting.

52. The method according to claim 51 wherein the radio frames each have a same length and wherein the step of formatting the data packets according to radio frames is performed such that boundaries for the data packets are not necessarily aligned with boundaries for the radio frames.

53. The method according to claim 45 wherein the step of formatting the data packets according to radio frames includes a step of time-division multiplexing the data packets into the radio frames.

54. The method according to claim 45 wherein each data packets includes a data valid bit for each portion of packet data and wherein the method further comprises a step of removing the data valid bit for each portion of packet data.

55. The method according to claim 54 wherein each portion of packet data is four bits long.

56. The method according to claim 54 further comprising steps of:
  a. storing the each portion of packet data in successive locations of a buffer; and
  b. removing the packet data from the packet buffer prior to performing the step of formatting.

57. The method according to claim 54 further comprising a step of storing the data valid bit for each portion of packet data in association with the four bit portion of packet data.

58. The method according to claim 54 wherein the radio frames each have a same length and wherein the step of formatting the data packets according to radio frames is performed such that boundaries for the data packets are not necessarily aligned with boundaries for the radio frames.

59. The method according to claim 45 further comprising a step of communicating the radio frames over the wireless ink according to full-duplex communication.

* * * * *